(12) United States Patent
Schaefer et al.

(10) Patent No.: US 12,097,427 B1
(45) Date of Patent: Sep. 24, 2024

(54) ALTERNATE AVATAR CONTROLS

(71) Applicant: Meta Platforms Technologies, LLC, Menlo Park, CA (US)

(72) Inventors: Matthew Joel Schaefer, Berkeley, CA (US); Evan Jones, Kirkland, WA (US); Adria Navarro Lopez, San Francisco, CA (US); Max Ma, Woodinville, WA (US); Robert Berkebile, Phoenix, MD (US); Alex Elsayad, Toronto (CA)

(73) Assignee: Meta Platforms Technologies, LLC, Menlo Park, CA (US)

( * ) Notice: Subject to any disclaimer, the term of this patent is extended or adjusted under 35 U.S.C. 154(b) by 4 days.

(21) Appl. No.: 17/822,608

(22) Filed: Aug. 26, 2022

(51) Int. Cl.
*A63F 13/56* (2014.01)
*A63F 13/211* (2014.01)
*A63F 13/428* (2014.01)

(52) U.S. Cl.
CPC .......... *A63F 13/428* (2014.09); *A63F 13/211* (2014.09); *A63F 13/56* (2014.09)

(58) Field of Classification Search
CPC ....... A63F 13/428; A63F 13/211; A63F 13/56
See application file for complete search history.

(56) References Cited

U.S. PATENT DOCUMENTS 6,072,467 A * 6/2000 Walker ................. G06F 3/0346
345/157
6,556,196 B1 4/2003 Blanz et al.
(Continued)

FOREIGN PATENT DOCUMENTS

CN 107330969 A 11/2017
CN 113050795 A 6/2021
(Continued)

OTHER PUBLICATIONS

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

(Continued)

*Primary Examiner* — David L Lewis
*Assistant Examiner* — Shauna-Kay N. Hall
(74) *Attorney, Agent, or Firm* — Potomac Law Group PLLC; Dannon Allbee

(57) ABSTRACT

Controlling an avatar in an XR environment can be based on input(s) from external, non-XR computing devices, such as mobile devices. An external device can capture sensor data, audio data, and/or image data, which are processed by an avatar control system to determine a gesture performed by the user, gauge the level of intensity or excitement of the user, and/or infer the user's sentiment or emotional state. The avatar control system can generate a motion plan based on these inferences drawn from the external device sensor data based on a baseline animation or motion template. The system can generate avatar animations that have exaggerated or understated expressions relative to the user's real-world gestures, possibly exceeding limitations of a kinematic model that otherwise constrain the avatar's animations. The technology can enable users to control an avatar in an XR environment without specialized XR equipment.

18 Claims, 11 Drawing Sheets

(56) References Cited

U.S. PATENT DOCUMENTS

| | | | |
|---|---|---|---|
| 6,842,175 B1 | 1/2005 | Schmalstieg et al. | |
| 7,701,439 B2 | 4/2010 | Hillis et al. | |
| 8,026,918 B1 | 9/2011 | Murphy | |
| D683,749 S | 6/2013 | Hally | |
| D689,874 S | 9/2013 | Brinda et al. | |
| 8,947,351 B1 | 2/2015 | Noble | |
| D726,219 S | 4/2015 | Chaudhri et al. | |
| D727,352 S | 4/2015 | Ray et al. | |
| D727,354 S | 4/2015 | Park et al. | |
| D733,740 S | 7/2015 | Lee et al. | |
| 9,117,274 B2 | 8/2015 | Liao et al. | |
| 9,292,089 B1 | 3/2016 | Sadek | |
| D761,273 S | 7/2016 | Kim et al. | |
| D763,279 S | 8/2016 | Jou | |
| 9,477,368 B1 | 10/2016 | Filip et al. | |
| D775,179 S | 12/2016 | Kimura et al. | |
| D775,196 S | 12/2016 | Huang et al. | |
| 9,530,252 B2 | 12/2016 | Poulos et al. | |
| D780,794 S | 3/2017 | Kisielius et al. | |
| D781,905 S | 3/2017 | Nakaguchi et al. | |
| D783,037 S | 4/2017 | Hariharan et al. | |
| D784,394 S | 4/2017 | Laing et al. | |
| D784,395 S | 4/2017 | Laing et al. | |
| D787,527 S | 5/2017 | Wilberding | |
| D788,136 S | 5/2017 | Jaini et al. | |
| D788,793 S | 6/2017 | Ogundokun et al. | |
| D789,416 S | 6/2017 | Baluja et al. | |
| D789,977 S | 6/2017 | Mijatovic et al. | |
| D790,567 S | 6/2017 | Su et al. | |
| D791,823 S | 7/2017 | Zhou | |
| D793,403 S | 8/2017 | Cross et al. | |
| 9,770,203 B1 | 9/2017 | Berme et al. | |
| 9,817,472 B2 | 11/2017 | Lee et al. | |
| D817,994 S | 5/2018 | Jou | |
| D819,065 S | 5/2018 | Xie et al. | |
| D824,951 S | 8/2018 | Kolbrener et al. | |
| D828,381 S | 9/2018 | Lee et al. | |
| D829,231 S | 9/2018 | Hess et al. | |
| D831,681 S | 10/2018 | Eilertsen | |
| D835,665 S | 12/2018 | Kimura et al. | |
| 10,168,768 B1 | 1/2019 | Kinstner | |
| D842,889 S | 3/2019 | Krainer et al. | |
| 10,220,303 B1 | 3/2019 | Schmidt et al. | |
| 10,248,284 B2 | 4/2019 | Itani et al. | |
| D848,474 S | 5/2019 | Baumez et al. | |
| D850,468 S | 6/2019 | Malahy et al. | |
| D851,123 S | 6/2019 | Turner | |
| D853,431 S | 7/2019 | Sagrillo et al. | |
| D854,551 S | 7/2019 | Pistiner et al. | |
| D856,366 S | 8/2019 | Richardson | |
| D859,426 S | 9/2019 | Poes | |
| 10,473,935 B1 | 11/2019 | Gribetz et al. | |
| 10,521,944 B2 | 12/2019 | Sareen et al. | |
| 10,665,019 B2 | 5/2020 | Hildreth et al. | |
| D888,071 S | 6/2020 | Wilberding | |
| D900,123 S | 10/2020 | Lopes | |
| 10,839,481 B1 | 11/2020 | Chen | |
| D908,713 S | 1/2021 | Fremine et al. | |
| D910,655 S | 2/2021 | Matthewman et al. | |
| D910,660 S | 2/2021 | Chaturvedi et al. | |
| 10,916,220 B2 | 2/2021 | Ngo | |
| 10,976,804 B1 | 4/2021 | Atlas et al. | |
| 10,987,573 B2 | 4/2021 | Nietfeld et al. | |
| 10,990,240 B1 | 4/2021 | Ravasz et al. | |
| 11,086,476 B2 | 8/2021 | Inch et al. | |
| 11,217,036 B1 | 1/2022 | Albuz et al. | |
| 11,295,503 B1 | 4/2022 | Orme et al. | |
| 11,475,639 B2 | 10/2022 | Booth et al. | |
| 11,861,757 B2 | 1/2024 | Booth et al. | |
| 11,893,674 B2 | 2/2024 | Orme et al. | |
| 2004/0266506 A1* | 12/2004 | Herbrich | A63F 13/30 463/6 |
| 2005/0162419 A1 | 7/2005 | Kim et al. | |
| 2008/0089587 A1 | 4/2008 | Kim et al. | |
| 2008/0215994 A1* | 9/2008 | Harrison | H04L 67/131 715/757 |
| 2009/0044113 A1* | 2/2009 | Jones | G06T 13/40 715/707 |
| 2009/0251471 A1* | 10/2009 | Bokor | G06T 13/40 345/474 |
| 2009/0265642 A1* | 10/2009 | Carter | G06F 3/011 715/757 |
| 2010/0306716 A1 | 12/2010 | Perez | |
| 2011/0148916 A1 | 6/2011 | Blattner | |
| 2011/0267265 A1 | 11/2011 | Stinson | |
| 2011/0302535 A1 | 12/2011 | Clerc et al. | |
| 2012/0069168 A1 | 3/2012 | Huang et al. | |
| 2012/0105473 A1 | 5/2012 | Bar-Zeev et al. | |
| 2012/0113223 A1 | 5/2012 | Hilliges et al. | |
| 2012/0117514 A1 | 5/2012 | Kim et al. | |
| 2012/0143358 A1 | 6/2012 | Adams et al. | |
| 2012/0206345 A1 | 8/2012 | Langridge | |
| 2012/0275686 A1 | 11/2012 | Wilson et al. | |
| 2012/0293544 A1 | 11/2012 | Miyamoto et al. | |
| 2013/0038601 A1* | 2/2013 | Han | G06F 3/011 345/473 |
| 2013/0063345 A1 | 3/2013 | Maeda | |
| 2013/0125066 A1 | 5/2013 | Klein et al. | |
| 2013/0147793 A1 | 6/2013 | Jeon et al. | |
| 2013/0265220 A1 | 10/2013 | Fleischmann et al. | |
| 2014/0078176 A1 | 3/2014 | Kim et al. | |
| 2014/0125598 A1 | 5/2014 | Cheng et al. | |
| 2014/0191946 A1 | 7/2014 | Cho et al. | |
| 2014/0236996 A1 | 8/2014 | Masuko et al. | |
| 2015/0035746 A1 | 2/2015 | Cockburn et al. | |
| 2015/0054742 A1 | 2/2015 | Imoto et al. | |
| 2015/0062160 A1 | 3/2015 | Sakamoto et al. | |
| 2015/0123967 A1 | 5/2015 | Quinn et al. | |
| 2015/0138099 A1* | 5/2015 | Major | H04W 4/027 345/173 |
| 2015/0153833 A1 | 6/2015 | Pinault et al. | |
| 2015/0160736 A1 | 6/2015 | Fujiwara | |
| 2015/0169076 A1 | 6/2015 | Cohen et al. | |
| 2015/0181679 A1 | 6/2015 | Liao et al. | |
| 2015/0206321 A1 | 7/2015 | Scavezze et al. | |
| 2015/0220150 A1 | 8/2015 | Plagemann et al. | |
| 2015/0261659 A1 | 9/2015 | Bader et al. | |
| 2015/0293666 A1 | 10/2015 | Lee et al. | |
| 2015/0358614 A1 | 12/2015 | Jin | |
| 2015/0371441 A1 | 12/2015 | Shim | |
| 2016/0035133 A1 | 2/2016 | Ye et al. | |
| 2016/0062618 A1 | 3/2016 | Fagan et al. | |
| 2016/0110052 A1 | 4/2016 | Kim et al. | |
| 2016/0147308 A1 | 5/2016 | Gelman et al. | |
| 2016/0170603 A1 | 6/2016 | Bastien et al. | |
| 2016/0178936 A1 | 6/2016 | Yang et al. | |
| 2016/0314341 A1 | 10/2016 | Maranzana et al. | |
| 2016/0378291 A1 | 12/2016 | Pokrzywka | |
| 2017/0031503 A1 | 2/2017 | Rosenberg et al. | |
| 2017/0060230 A1 | 3/2017 | Faaborg et al. | |
| 2017/0061696 A1 | 3/2017 | Li et al. | |
| 2017/0109936 A1 | 4/2017 | Powderly et al. | |
| 2017/0139478 A1 | 5/2017 | Jeon et al. | |
| 2017/0192513 A1 | 7/2017 | Karmon et al. | |
| 2017/0236320 A1 | 8/2017 | Gribetz et al. | |
| 2017/0237789 A1 | 8/2017 | Harner et al. | |
| 2017/0262063 A1 | 9/2017 | Blenessy et al. | |
| 2017/0270715 A1 | 9/2017 | Lindsay et al. | |
| 2017/0278304 A1 | 9/2017 | Hildreth et al. | |
| 2017/0287225 A1 | 10/2017 | Powderly et al. | |
| 2017/0296363 A1 | 10/2017 | Yetkin et al. | |
| 2017/0316606 A1 | 11/2017 | Khalid et al. | |
| 2017/0336951 A1 | 11/2017 | Palmaro | |
| 2017/0364198 A1 | 12/2017 | Yoganandan et al. | |
| 2018/0017815 A1 | 1/2018 | Chumbley et al. | |
| 2018/0059901 A1 | 3/2018 | Gullicksen | |
| 2018/0082454 A1 | 3/2018 | Sahu et al. | |
| 2018/0096537 A1 | 4/2018 | Kornilov et al. | |
| 2018/0107278 A1 | 4/2018 | Goel et al. | |
| 2018/0113599 A1 | 4/2018 | Yin | |
| 2018/0144556 A1 | 5/2018 | Champion et al. | |
| 2018/0150993 A1 | 5/2018 | Newell et al. | |
| 2018/0307303 A1 | 10/2018 | Powderly et al. | |

(56) References Cited

U.S. PATENT DOCUMENTS

| | | |
|---|---|---|
| 2018/0322701 A1 | 11/2018 | Pahud et al. |
| 2018/0335925 A1 | 11/2018 | Hsiao et al. |
| 2018/0349690 A1 | 12/2018 | Rhee et al. |
| 2019/0050427 A1 | 2/2019 | Wiesel et al. |
| 2019/0065027 A1 | 2/2019 | Hauenstein et al. |
| 2019/0094981 A1 | 3/2019 | Bradski et al. |
| 2019/0102044 A1 | 4/2019 | Wang et al. |
| 2019/0107894 A1 | 4/2019 | Hebbalaguppe et al. |
| 2019/0130172 A1 | 5/2019 | Zhong et al. |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0310757 A1 | 10/2019 | Lee et al. |
| 2019/0313915 A1 | 10/2019 | Tzvieli et al. |
| 2019/0340419 A1 | 11/2019 | Milman et al. |
| 2019/0362562 A1 | 11/2019 | Benson |
| 2019/0377416 A1 | 12/2019 | Alexander |
| 2019/0385372 A1 | 12/2019 | Cartwright et al. |
| 2020/0050289 A1 | 2/2020 | Hardie-Bick et al. |
| 2020/0051527 A1 | 2/2020 | Ngo |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0110280 A1 | 4/2020 | Gamperling et al. |
| 2020/0111260 A1 | 4/2020 | Osborn et al. |
| 2020/0211218 A1 | 7/2020 | Le Gallou et al. |
| 2020/0211512 A1 | 7/2020 | Sztuk et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0306640 A1 | 10/2020 | Kolen et al. |
| 2020/0312002 A1 | 10/2020 | Comploi et al. |
| 2020/0349635 A1 | 11/2020 | Ghoshal et al. |
| 2021/0007607 A1 | 1/2021 | Frank et al. |
| 2021/0011556 A1 | 1/2021 | Atlas et al. |
| 2021/0019911 A1 | 1/2021 | Kusakabe et al. |
| 2021/0088811 A1 | 3/2021 | Varady et al. |
| 2021/0090333 A1 | 3/2021 | Ravasz et al. |
| 2021/0124475 A1 | 4/2021 | Inch et al. |
| 2021/0134042 A1 | 5/2021 | Streuber et al. |
| 2021/0168324 A1 | 6/2021 | Ngo |
| 2021/0247846 A1 | 8/2021 | Shriram et al. |
| 2021/0296003 A1 | 9/2021 | Baeurele |
| 2021/0312658 A1 | 10/2021 | Aoki et al. |
| 2021/0383594 A1 | 12/2021 | Tang et al. |
| 2022/0157036 A1 | 5/2022 | Chen et al. |
| 2022/0292774 A1 | 9/2022 | Yang et al. |
| 2023/0115028 A1 | 4/2023 | Arunachala |
| 2023/0252721 A1 | 8/2023 | Aleem et al. |
| 2023/0351710 A1 | 11/2023 | Doyle et al. |
| 2024/0062492 A1 | 2/2024 | Booth et al. |
| 2024/0087201 A1 | 3/2024 | Orme et al. |

FOREIGN PATENT DOCUMENTS

| | | |
|---|---|---|
| WO | 2017205903 A1 | 12/2017 |
| WO | 2019137215 A1 | 7/2019 |

OTHER PUBLICATIONS

International Preliminary Report on Patentability for International Application No. PCT/US2020/052976, mailed May 5, 2022, 9 pages.

International Search Report and Written Opinion for International Application No. PCT/US2020/052976, mailed Dec. 11, 2020, 10 Pages.

International Search Report and Written Opinion for International Application No. PCT/US2021/064674, mailed Apr. 19, 2022, 13 pages.

International Search Report and Written Opinion for International Application No. PCT/US2022/046196, mailed Jan. 25, 2023, 11 pages.

Katz N., et al., "Extending Web Browsers with a Unity 3D-Based Virtual Worlds Viewer," IEEE Computer Society, Sep./Oct. 2011, vol. 15 (5), pp. 15-21.

Mayer S., et al., "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Qiao X., et al., "Web AR: A Promising Future for Mobile Augmented Reality—State of the Art, Challenges, and Insights," Proceedings of the IEEE, Apr. 2019, vol. 107 (4), pp. 651-666.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et aL, "EyePointing: A Gaze-Based Selection Technique," Proceedings of Mensch and Computer, Hamburg, Germany, Sep. 8-11, 2019, pp. 719-723.

Srinivasa R.R., "Augmented Reality Adaptive Web Content," 13th IEEE Annual Consumer Communications & amp; Networking Conference (CCNC), 2016, pp. 1-4.

Trademark Application Serial No. 73289805, filed Dec. 15, 1980, 1 page.

Trademark Application Serial No. 73560027, filed Sep. 25, 1985, 1 page.

Trademark Application Serial No. 74155000, filed Apr. 8, 1991, 1 page.

Trademark Application Serial No. 76036844, filed Apr. 28, 2000, 1 page.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Whitton M., et al., "Integrating Real and Virtual Objects in Virtual Environments," Aug. 24, 2007, Retrieved from http://web.archive.org/web/20070824035829/ http://www.cs.unc.edu/~whitton/ExtendedCV/Papers/2005-HCII-Whitton-MixedEnvs.pdf, on May 3, 2017, 10 pages.

Chen Y., et al., "Object Modeling by Registration of Multiple Range Images," Proceedings of the 1991 IEEE International Conference on Robotics and Automation, Apr. 1991, pp. 2724-2729, Retrieved from the internet: URL: https://graphics.stanford.edu/courses/cs348a-17-winter/Handouts/chen-medioni-align-rob91.pdf.

Goldsmiths M, "Dancing into the Metaverse: A Real-Time virtual Dance Experience," Youtube [online], Nov. 14, 2021 [Retrieved on Sep. 5, 2023], 2 pages, Retrieved from the Internet: URL: https://www.youtube.com/watch?v=aNg-gqZNYRO.

International Preliminary Report on Patentability for International Application No. PCT/US2021/064674, mailed Jul. 6, 2023, 12 pages.

International Search Report and Written Opinion for International Application No. PCT/US2023/020446, mailed Sep. 14, 2023, 14 pages.

Junghyun A., et al., "Motion Level-of-Detail: A Simplification Method on Crowd Scene," Proceedings of the 17th International Conference on Computer Animation and Social Agents [online], Jan. 23, 2013 [Retrieved on Sep. 7, 2023], 8 pages, Retrieved from the Internet: URL:https://citeseerx.ist.psu.edu/viewdoc/download;jsessionid=460ED1CB79EFA18B484B256E73A88FF3?.

Khan M.A., "Multiresolution Coding of Motion Capture Data for Real-Time Multimedia Applications," Multimedia Tools and Applications, Sep. 16, 2016, vol. 76, pp. 16683-16698.

Milborrow S., "Active Shape Models with Stasm," [Retrieved on Sep. 20, 2022], 3 pages, Retrieved from the internet: URL: http://www.milbo.users.sonic.net/stasm/.

Milborrow S., et al., "Active Shape Models with SIFT Descriptors and Mars," Department of Electrical Engineering, 2014, 8 pages,

(56) References Cited

OTHER PUBLICATIONS

Retrieved from the internet: URL: http://www.milbo.org/stasm-files/active-shape-models-with-sift-and-mars.pdf.
Moran F., et al., "Adaptive 3D Content for Multi-Platform On-Line Games," 2007 International Conference on Cyberworlds (CW'07), Oct. 24, 2007, pp. 194-201.
MRPT: "RANSAC C++ Examples," 2014, 6 pages, Retrieved from the internet: URL: https://www.mrpt.org/tutorials/programming/maths-and-geometry/ransac-c-examples/.
NEXTWORLDVR, "Realtime Motion Capture 3ds Max w/ KINECT," Youtube [online], Mar. 14, 2017 [Retrieved on Sep. 5, 2023], 2 pages, Retrieved from the Internet: URL:https://www.youtube.com/watch?v=vOYWYEOwRGO.
Savoye Y., et al., "Multi-Layer Level of Detail for Character Animation," Workshop in Virtual Reality Interactions and Physical Simulation VRIPHYS (2008) [online], Nov. 18, 2008 [Retrieved on Sep. 7, 2023], 10 pages, Retrieved from the Internet: URL: http://www.animlife.com/publications/vriphys08.pdf.
Wikipedia: "Canny Edge Detector," [Retrieved on Sep. 20, 2022], 10 pages, Retrieved from the internet: URL: https://en.wikipedia.org/wiki/Canny_edge_detector.
Wikipedia: "Iterative Closest Point," [Retrieved on Sep. 20, 2022], 3 pages, Retrieved from the internet: URL: https://en.wikipedia.org/wiki/Iterative_closest_point.
Huang B., et al., "Eye Landmarks Detection via Weakly Supervised Learning," Pattern Recognition, Feb. 2020, vol. 98, 11 pages.
International Preliminary Report on Patentability for International Application No. PCT/US2022/046196, mailed Apr. 25, 2024, 9 pages.
Tang X., et al., "Facial Landmark Detection by Semi-Supervised Deep Learning," Neurocomputing, Jul. 5, 2018, vol. 297, pp. 22-32.
Wan Z., et al., "A Method of Free-Space Point-of-Regard Estimation Based on 3D Eye Model and Stereo Vision," Applied Science, Sep. 30, 2018, vol. 08, No. 10, 17 pages.
Wu C., et al., "Automatic Eyeglasses Removal from Face Images," IEEE Transactions on Pattern Analysis and Machine Intelligence, Mar. 2004, vol. 26, No. 03, pp. 322-336.

* cited by examiner

US 12,097,427 B1

ALTERNATE AVATAR CONTROLS

TECHNICAL FIELD

The present disclosure is directed to controlling avatar animations in an artificial reality (XR) system using non-XR input devices.

BACKGROUND

Artificial reality (XR) systems provide an XR environment, allowing users the ability to experience different worlds, learn in new ways, and make better connections with others. Typically, XR systems can track user movements using computing devices specifically designed to receive explicit user inputs and immerse users in an XR environment, such as head-mounted displays (e.g., smart glasses, VR/AR headsets), handheld controllers, body-mounted wearable devices with motion sensors (e.g., gloves, motion capture systems, etc.), and/or other computing systems that can present an artificial reality environment to the user and enable the user to interact with virtual objects in the environment using body gestures and/or controller inputs. Traditional artificial virtual reality systems track user movements via XR-specific input devices and translate them into interactions with "virtual objects" (i.e., computer-generated object representations appearing in a virtual environment.)

In many artificial reality environments, the user's presence is represented by an avatar. The avatar's movements can be controlled by the user, often using one or more control devices (e.g., a joystick), or using devices and sensors connected to the XR system that sense the user's movements (e.g., cameras, wearable sensors), or a combination of these. Movement captured by one or more of these control devices can be translated into a corresponding movement or action by the avatar in the XR environment.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
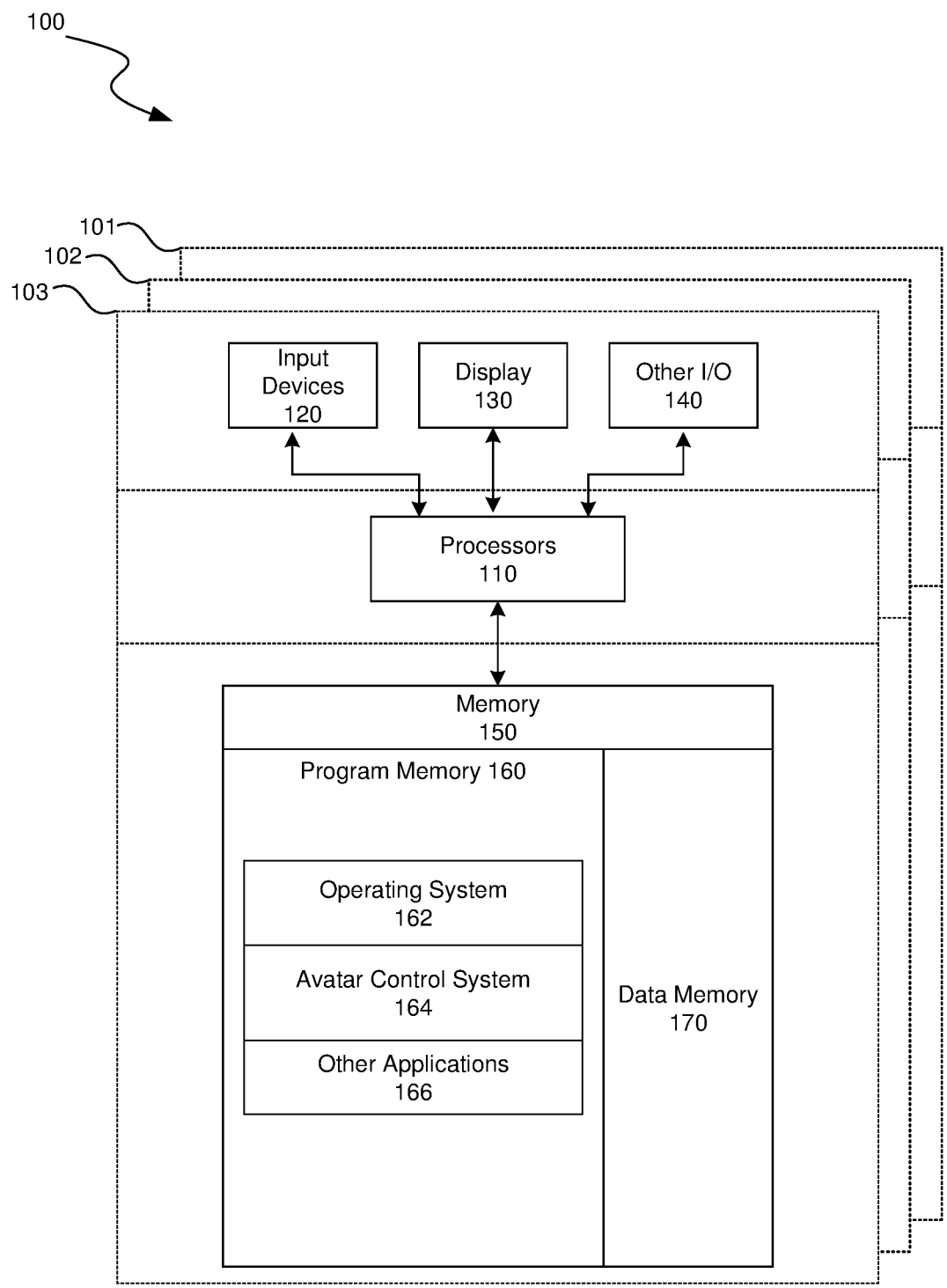
FIG. 1 is a block diagram illustrating an overview of devices on which some implementations of the present technology can operate.

Aspects of the present disclosure are directed to controlling an avatar in an XR environment based on input(s) from non-XR computing devices, such as mobile devices or other general purpose computing devices (which may be collectively referred to herein as "external" devices). An external device may include sensors (e.g., accelerometer, magnetometer, gyroscope, altimeter, inertial measurement unit (IMU), etc.), transducers (e.g., a microphone), and/or imagers (e.g., one or more cameras) capable of sensing a user's pose, movement, voice, and/or facial expression (which may be collectively referred to herein as the user's "behavior"). An avatar control system can receive data from one or more of the sensors, transducers, or imagers and infer the user's behavior in the real world. In addition, the avatar control system can compute a level of intensity or expressiveness of the user's behavior based on some combination of inputs. The inferred user's behavior and level of intensity can then be used to generate a motion plan that causes the avatar to perform an animation.

In some embodiments, an avatar control system can combine data from two or more sensors, transducers, and/or imagers to improve the fidelity of the inference of the user's intended input. Consider an example where a user waves their mobile device above their head (e.g., as is sometimes done during slow or emotional songs at a concert). It can be difficult to infer solely from acceleration data whether the user is waving their hand at waist level, to the side, in front of them, or above their head. To improve fidelity, a sensor fusion algorithm might combine IMU data (e.g., oscillating horizontal acceleration with the phone orientation tilting slightly to the left or right with each wave) and altimeter data (e.g., a sensed increase an altitude before the oscillating acceleration) to more accurately infer that the user is waving the mobile device above their head. Accordingly, the avatar control system can generate a motion plan for the user's avatar to wave its hand above its head.

Similarly, an avatar control system can receive and process data from other inputs on the user's mobile device, such as microphone(s) and/or camera(s). Captured audio can contain spoken words, which can be processed to infer sentiment, the user's level of excitement (e.g., based on loudness), and otherwise provide additional context regarding the user's current activity. For instance, the user's breathing rate, pitch, and other tonal qualities of the user's voice can signify the extent of the user's excitement. In addition, images and/or videos can provide additional context about the user's actions in the real world. Images and/or video frames of the user's face can be processed (e.g., using keypoint detection) to recognize facial expressions and infer the user's emotional state. Likewise, images and/or video frames of the user's body can be processed (e.g., using pose detection model(s)) to recognize the user's pose at a given time, and/or be processed over a period of time to recognize a sequence of poses (i.e., activity recognition). In this manner, an avatar control system can use auditory and/or visual data from a mobile device to independently infer a user's actions, and/or to provide additional context to improve the accuracy of an inference based on sensor data.

In various embodiments, an avatar control system can obtain kinematic rules associated with a body model—such as a kinematic chain defined as substantially rigid bodies connected by joints that constrain the motion of the avatar—for a user's avatar. The kinematic rules might define relationships between the body parts and joints of the avatar, such that poses and/or movements can be performed within the constraints of those kinematic rules. In some cases, inverse kinematics (IK) techniques can be used to determine whether a given pose or movement does not exceed the limits set forth by the kinematic rules. If a particular pose or movement is permitted by an avatar control system, the system can generate one or more incremental changes in the avatar's pose (e.g., across a set of "frames" or time steps within a game engine) to construct a motion plan for changing the avatar's pose, effecting locomotion of the avatar, and/or animating the avatar. For example, applying IK techniques to an avatar's body model can be used to generate a motion plan to cause the avatar to make various facial expressions, in-place gestures or emotes (e.g., waving, bowing, cheering, dancing, clapping, etc.), and/or other movements.

In some implementations, one or more types of animations or movements may be stored as parameterized "motion templates." For example, a motion template for waving an avatar's hand might specify the general motion or animation (e.g., lifting the wrist above the avatar's head and swaying it side to side). That waving motion template can receive one or more parameters that tune aspects of that waving motion, such as how high the avatar's hand is raised, how far the avatar's hand sways from left to right, and/or how quickly the avatar's hand moves when waving, among other possible parameters. The avatar control system can use such parameterized motion templates to generate a motion plan for an avatar which, when applied, causes the avatar to perform a corresponding animation that is tuned according to the specified parameter(s).

One way in which motion templates can be parameterized is by constraining the range of motion of a particular type of animation or movement relative to an intensity score. For example, the waving motion template may be configured such that a low intensity score generates a gentle or subtle waving animation motion plan, while a high intensity score generates a wide-sweeping, fast, and emphatic waving animation motion plan. In some embodiments, the avatar control system can calculate such an intensity score, which represents the level of the user's excitement over a period of time. As a specific example, an avatar control system can compute the intensity of the user's movement by determining the peak-to-peak amplitude of acceleration over a set of data samples, which can be mapped to an intensity level (e.g., a scalar value normalized between zero and one). The avatar control system can perform statistical analyses (e.g., average, simple moving average, cumulative moving average, weighted moving average, etc.) on the intensity level computed across one or more sample periods to derive an intensity score. For instance, an intensity level may be computed from mobile device data once per second, and the intensity score might be derived as a five-second moving average of the intensity level. In this manner, the avatar control system can quantify the user's level of excitement, which itself may serve as a parameter when generating a motion plan for a user's avatar.

Data from other sensor(s), microphone(s), and/or camera(s) may serve as additional inputs to provide additional context to the avatar control system when computing the intensity score. More particularly, the rate of the rotation of the mobile device, the loudness measured by the mobile device's microphone, the user's facial expression(s), the user's pose(s), and/or other information derived from mobile device data can be factored in when computing the intensity score. In some implementations, the user can configure which sensors, transducers, and/or imagers can be used as inputs into the avatar control system. Accordingly, the manner in which the intensity level is computed may dynamically adapt based on which sources of data are available.

In an example embodiment, an XR system can receive data captured by sensor(s), microphone(s), and/or camera(s) of a user's mobile device. An avatar control system processes that mobile device data (e.g., using sensor fusion algorithm(s), machine learning model(s), etc.) to infer the movement, facial expression, or action that the user is performing in the real world, along with an associated level of intensity. In some cases, the user's movement, facial expression, or action is mapped to a motion template, such that the avatar control system can determine which motion template is associated with the mobile device data, if any. Based on a set of kinematic rules associated with the user's avatar, the inferred user action, the computed level of intensity, and (in some cases) the selected motion template, the avatar control system generates a motion plan for the user's avatar. The XR system can apply the generated motion plan to the user's avatar to cause the avatar to perform an animation based on the generated.

The motion plan can, in some cases, be constrained by the limits of the avatar's body model and/or by a set of kinematic constraints, such that the motion plan does not cause the avatar's body model to exceed what would be considered natural if it were a realistic, biological body. Indeed, many XR systems aim to mirror user movements with avatar movements (e.g., in an approximately 1:1 relationship) in order to create an experience that is similar to the real world.

However, it may be desirable to have an avatar's movements and expressions be more subtle or more exaggerated than the user's actual movements. For instance, a user attending an XR concert might want to express their enjoyment by cheering or dancing to a greater degree than they are able to cheer or dance in the real world (e.g., if the user doesn't want to disturb neighbors or roommates, if the user has disabilities limiting their ability to cheer or dance, the user wants their avatar to perform in a more energetic or extreme manner than is possible by a human body, etc.). Conversely, a user might want to tone down the expressiveness of their avatar, such if the user wants to appear calm when meeting a celebrity, or if the user suffers from certain illnesses (e.g., Parkinson's disease, Huntington's disease, Tourette's syndrome, etc.).

Accordingly, the manner in which the computed intensity score influences the generated motion plan can be manually configured by the user to either exaggerate or understate the user's real world action. For example, a user may configure the avatar control system to exaggerate their avatar's animations relative to the determined intensity score (e.g., by some user-defined factor), to understate the avatar's animations relative to the determined intensity score, or to invert the determined intensity score. In some implementations, the user can configure the system to ignore or limit the determined intensity score all together—and either base motion plans on a fixed level of intensity, or limit the range of intensity scores to a specific set of boundaries. In effect, the user is able to configure how their real-world behavior is translated into avatar animations.

In some implementations, the avatar control system may permit the generation of motion plans that "break" or exceed the constraints of an avatar's body model. Some constraints—such as the size of each rigid body part, the ranges of motion for each joint, the requirement for each rigid body part to be directly coupled via a joint, the maximum rate of motion for each joint, etc. —may be temporarily relaxed or ignored to allow the avatar to perform animations that go beyond what might be considered realistic in a biological sense. For example, the avatar might vigorously wave its arm, with the size or length of its arm increasing relative to their proportions when motionless, and possibly with the rigid portions of the arm separating from the joints by some amount. In effect, the avatar's animation might appear exaggerated or unnatural. However, such exaggerated animations may be desirable to depict, in the XR environment, the user's real-world excitement.

As described herein, the term "sensor data" generally refers to any kind of signal, data, or information derived from any type of sensor, transducer, imager, or other sensing device. For the purposes of this application, a microphone is said to generate sensor data, in that it converts pressure waves into a signal, which can be converted into digital information via an analog-to-digital converter to output "sensor data." Likewise, a camera is said to generate sensor data, in that it converts photons incident on an image sensor into signal into charges, which are subsequently converted into signals that are themselves converted into digital information representing an intensity of light at a various pixels through various color filters—which collectively form an image or video frame. Accordingly, for the sake of brevity, the term "sensor data" may generally refer to information derived from any sensing apparatus.

As described herein, the term "kinematic rules" generally refers to one or more constraints, limitations, and/or relationships between rigid portions, joints, and/or other movement points of an avatar's body model which define how each rigid portion of the body can move with respect to other portions. For instance, a set of kinematic rules may constrain the movement, animation, and/or locomotion of an avatar's body model that is biologically modeled after a human being. The kinematic rules may be strictly enforced, such that a movement, animation, or locomotion of the avatar can only be performed within a range of motion as defined by a set of kinematic equations related to the kinematic chain forming the body model. For such kinematic rules, inverse kinematics can be applied to determine whether an avatar can perform an animation or pose and, if so, the joint angles necessary to achieve the desired animation or pose. In some cases, kinematic rules may also define the way in which a pose or animation that might otherwise exceed the strict limitations of a body model, thereby allowing an avatar to perform animations or form poses that are exaggerated beyond what might be considered anatomically possible.

As described herein, the term "movement point" generally refers points or regions of an avatar's body model whose position and/or orientation is controllable (e.g., within a constrained range of motion as defined by kinematic rule(s)). Movement points can include joints, simulated muscles (e.g., facial muscles), and/or body parts (e.g., which can be reoriented and/or repositioned) to emulate body movement of an anatomically analogous human being. Example types of emulated avatar body movements include facial expressiveness (e.g., eye movement, such as pupil movement, winking, blinking, eyebrow movement, neutral expressions, mouth movements/lip synchronization, non-verbal facial mouth movements, forehead expressions, cheek expressions, etc.), body and hand movements (e.g., movements of the torso and upper-body, body orientation relative to anchor point, hand tracking, shoulder movements, torso twisting, etc.), user action movements (e.g., simulated talking using facial expressions, simulated jumping, and simulated kneeling/ducking, simulated dancing, etc.), among others. An animation may involve a coordinated manipulation of movement points of an avatar in order to effect a pose, emote, and/or facial expression.

As described herein, the term "motion plan" generally refers to a series of frames in an XR system where each frame comprises an incremental change in the position and/or orientation of one or more parts of an avatar's body. For example, a motion plan to change an avatar's face from a frown to smile might involve a series of incremental updates to one or more movement points on the avatar's face to collectively curl the edges of the avatar's mouth to from a downward position to an upward position. As another example, a motion plan to wave the avatar's hand might involve coordinating joint movements and actuating an arm of the avatar to raise its hand above its head, and then moving the avatar's hand side to side pivoted at the elbow. Each frame of a motion plan can include a change or "delta" in one or more movement points, with the delta being related to the framerate of the XR application and the speed of the planned animation. A motion plan may comprise data representative of these incremental movements across a series of frames which can be used to either generate a rendering of the animation with respect to a particular avatar, and/or rendered live in an XR environment.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing XR systems receive inputs from headsets, controllers, and other XR-specific devices, which are often highly sensitive and update frequently to provide high-fidelity and low-latency input to the XR system. Such XR-specific input devices are designed to promote realism and immersion for users. Rather than attempting to infer what a user's action is from noisy or incomplete data, XR systems typically use high quality sensors that are physically coupled to the user's body to provide as much information as possible about the user's head orientation, hand pose, and changes in the user's body position. However, existing XR systems lack the ability to infer a user's actions from aspects of the user that the XR system does not explicitly and accurately monitor. For example, typical XR systems cannot determine the facial expression a user is making, in part because the XR system is worn around the user's face. In addition, an XR system may not know what the user's hands are doing unless their hands are within the field of view (FOV) of an XR headset's camera. As a result, it is difficult for XR systems to infer a user's mood, emotional state, and/or actions not directly observed by specialized hardware, which in turn makes it difficult for XR systems to generate a realistic avatar of the user that reflects the user's emotional state and pose in the real world. Moreover, existing XR systems require users to experience XR environments using specialized hardware, which users may either not own, or wish not to carry around with them everywhere they go.

In addition, users may wish to participate in XR experiences (e.g., XR games, XR applications, online multiplayer XR experiences, the metaverse, etc.) without having specialized XR system hardware. The avatar control system disclosed herein overcomes the above-described problems by allowing users to control an avatar's animations using a non-XR device, such as a mobile phone, tablet, or other traditional computing device. As most modern mobile devices contain a suite of sensors, microphone(s), and camera(s), the avatar control system can gather data about the user's emotional state, pose, and movement that might otherwise not be captured by previous XR systems. By gathering multi-modal data about the user (including, in some cases, the user's facial expression), the user's real world self can be better modeled in an XR environment. And unlike existing XR input devices which are designed to mirror a user's input in an XR environment in a biologically-consistent manner, the avatar control system can either understate or exaggerate a user's inputs—sometimes even exceeding kinematic constraints of an avatar's body model. In this manner, a user can express themselves via their avatar in ways that would otherwise not be possible with traditional XR systems.

Several implementations are discussed below in more detail in reference to the figures. FIG. 1 is a block diagram illustrating an overview of devices on which some implementations of the disclosed technology can operate. The devices can comprise hardware components of a computing system 100 that generates avatar motion plans from external device sensor data. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, avatar control system 164, and other application programs 166. Memory 150 can also include data memory 170 that can include, e.g., motion templates, avatar body models, kinematic rules, animation libraries, user privacy preferences, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
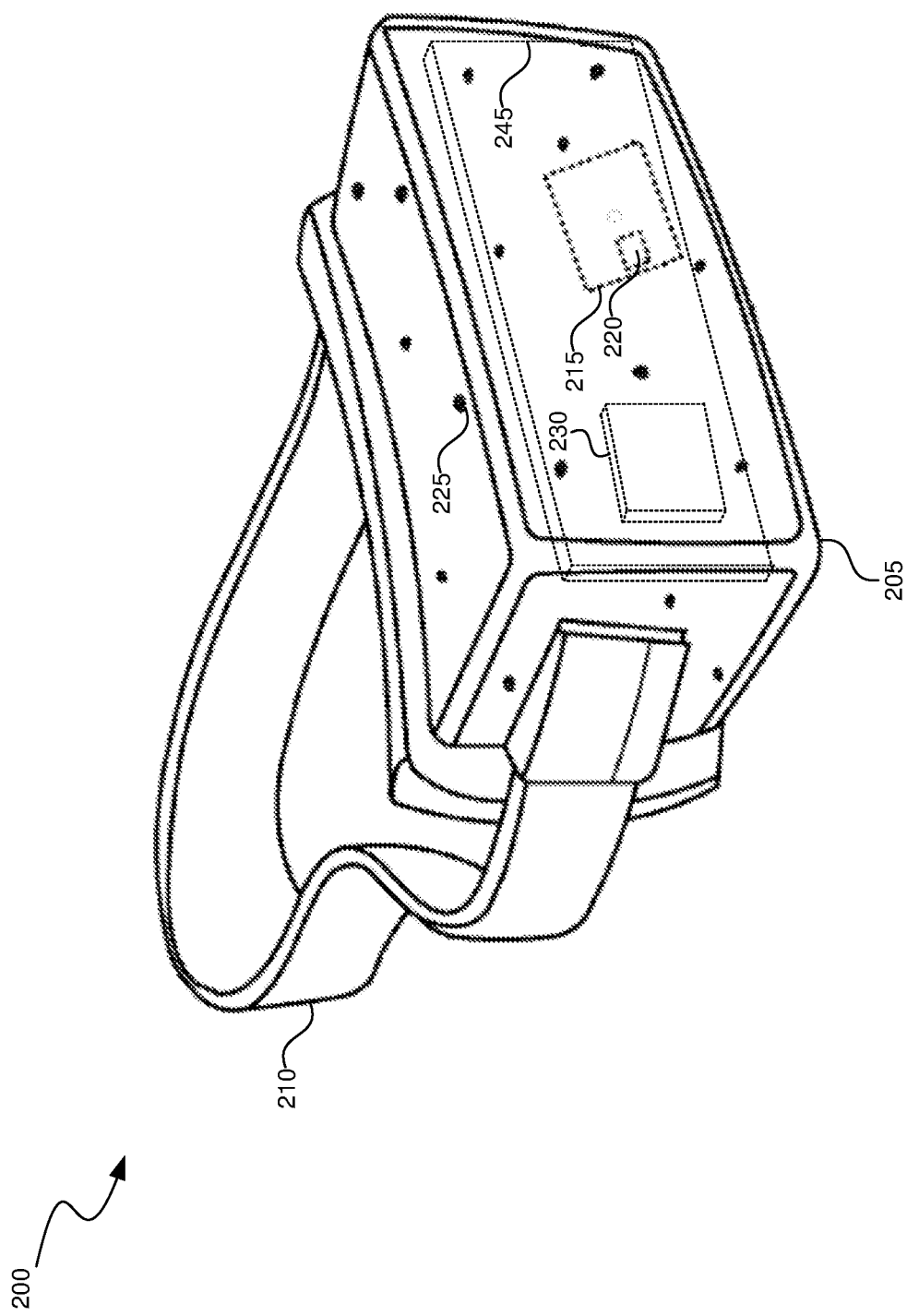
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
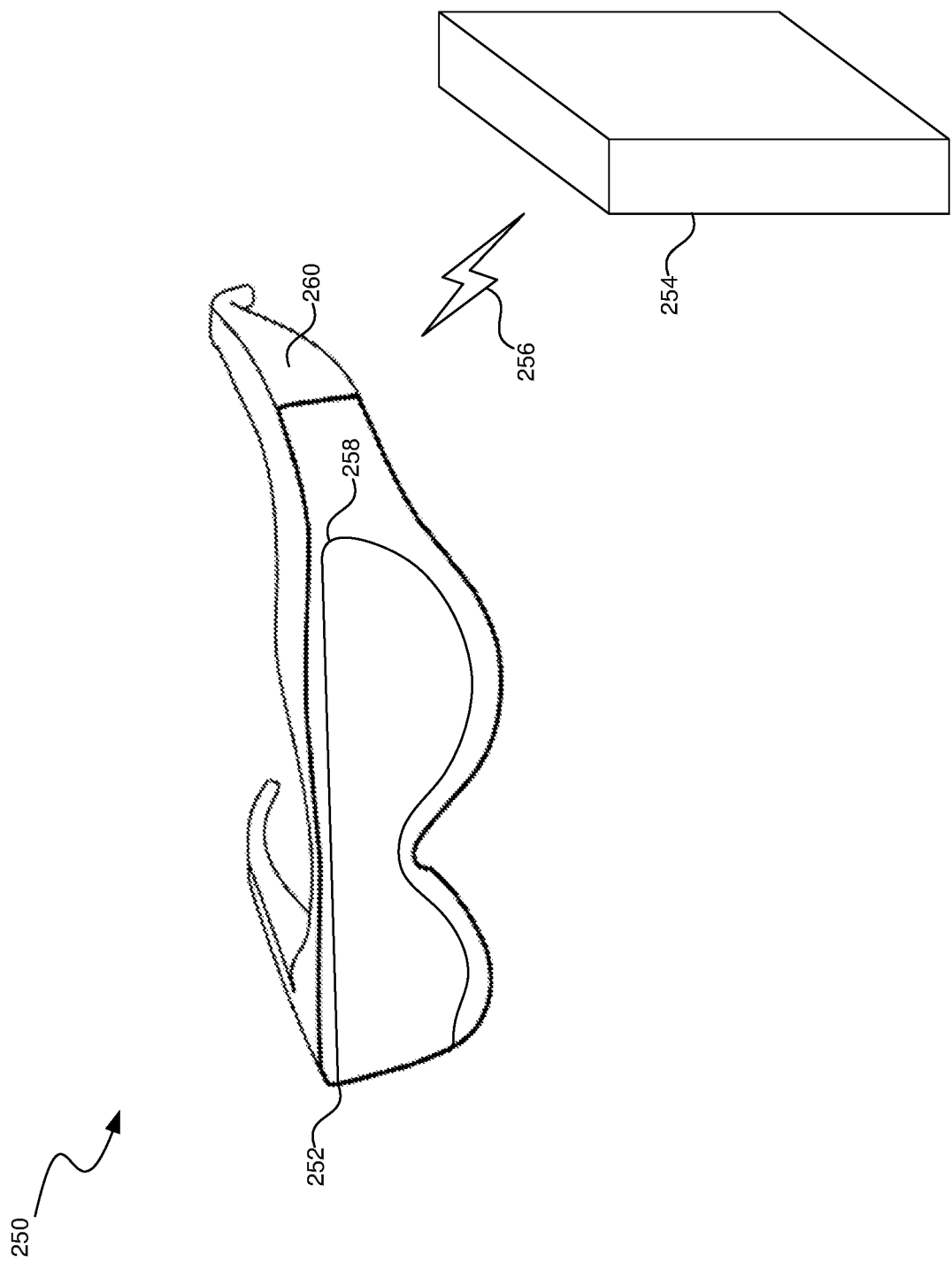
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
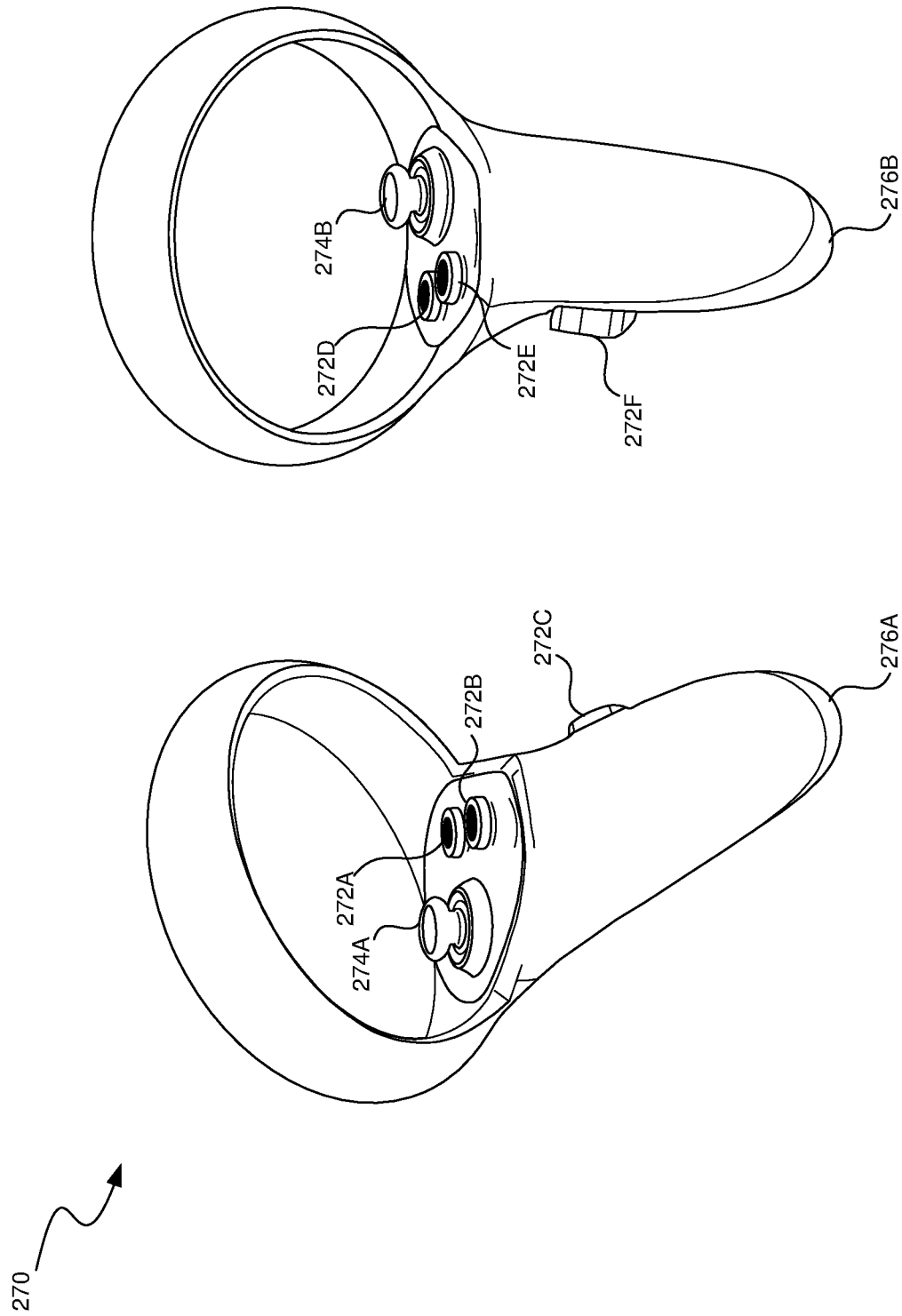
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
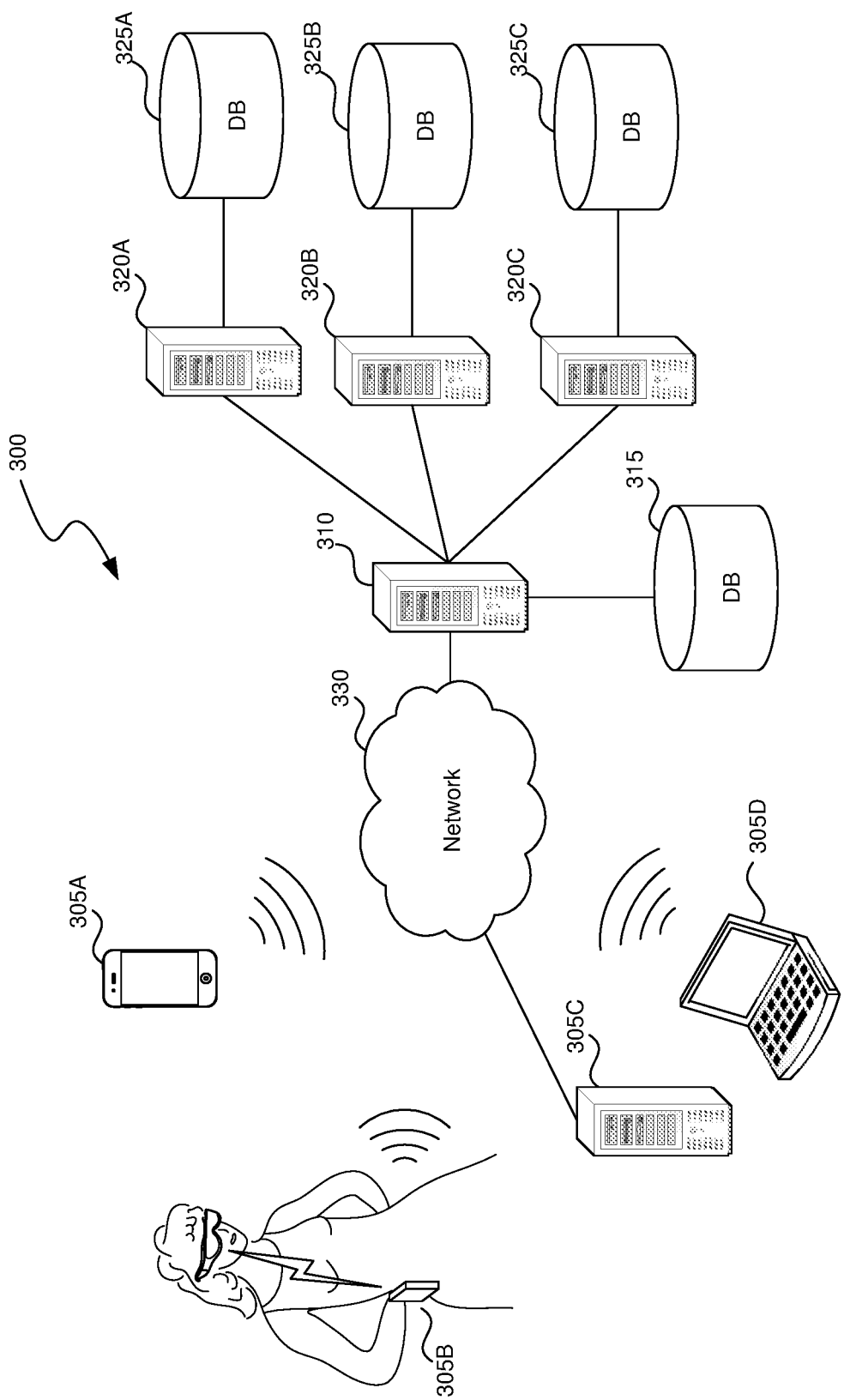
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
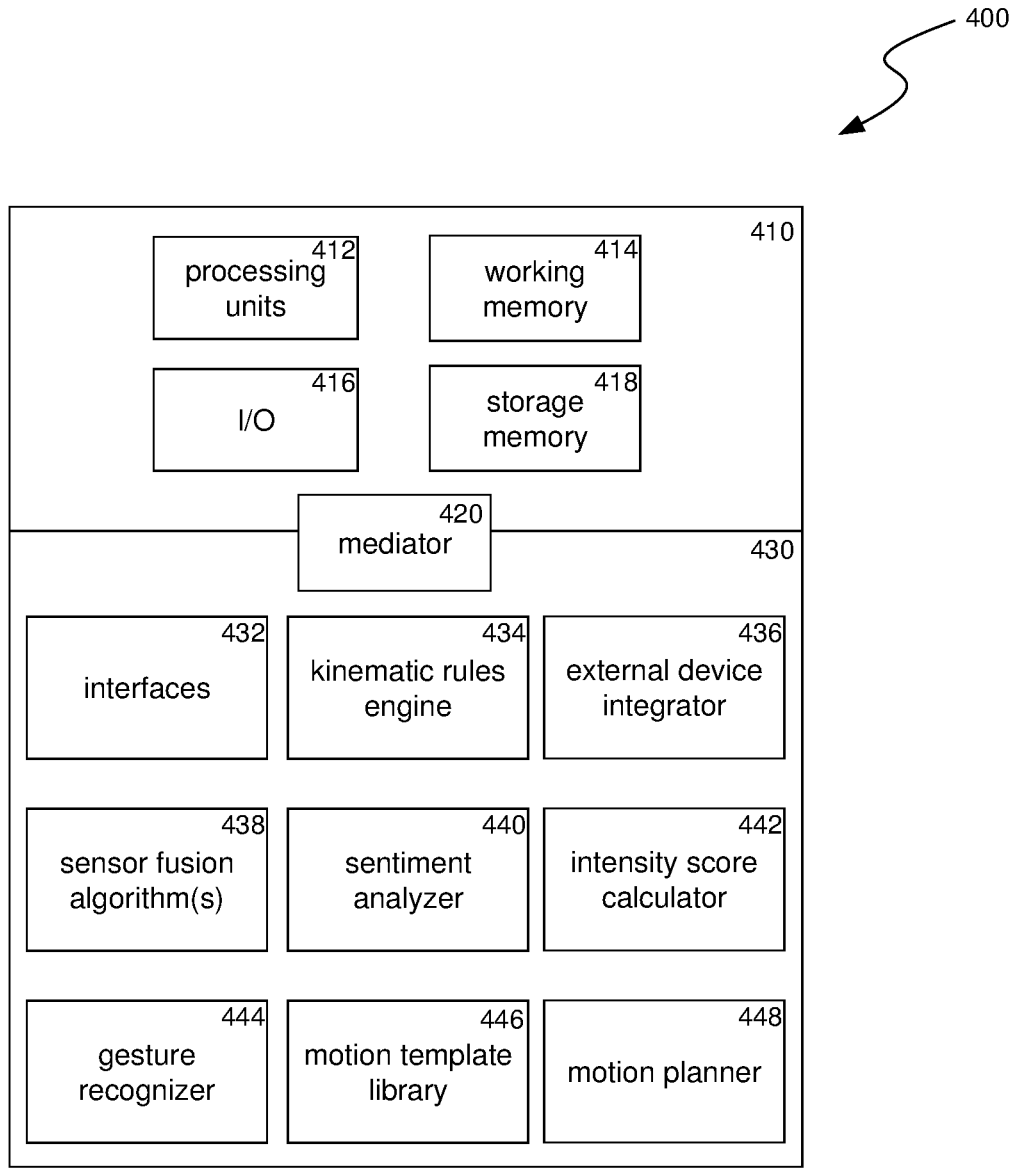
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for generating avatar motion plans from external device sensor data. Specialized components 430 can include kinematic rules engine 434, external device integrator 436, sensor fusion algorithm(s) 438, sentiment analyzer 440, intensity score calculator 442, gesture recognizer 444, motion template library 446, motion planner 448, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Kinematic rules engine 434 can apply kinematic equations and inverse kinematics to a body model to determine whether a particular pose or animation is permitted by the anatomical limits of the body model. In some cases, kinematic rules engine 434 can apply inverse kinematics to compute joint angles and body part positions and orientations that effects a particular pose or motion by the avatar, such that motion planner 448 can use kinematic rules engine 434 to determine the incremental movement of various parts of the avatar's body for each frame of an animation. In embodiments where kinematic rules engine 434 allow an avatar to move or pose in a manner that exceeds its anatomically-defined limits, kinematic rules engine 434 can apply a modified form of inverse kinematics to determine the position and orientation of each body part in a way that appears exaggerated, but still reasonably anthropomorphic. Additional details about kinematic rules are provided below with respect to kinematic rules 720 of FIG. 7.

External device integrator 436 can manage connections between an XR device or system and an external device, such as a mobile device. In some embodiments, an XR device can receive an indication from the external device to register with the XR device, such that the external device can "pair" or link to the XR system (e.g., via Wi-Fi, near field communication (NFC), Bluetooth™, etc.) and serve as an additional source of data. In some implementations, the external device can broadcast a signal to all XR devices in the vicinity of the external device. The signal can be received by the XR device which can cause a registration to begin or can cause the XR device to receive sensor data captured by the external device. In other embodiments, the external device may operate independently of any particular XR device, and instead execute a local application that connects the external device to an XR application operating on a remote computer or server. The application running on the external device may require the user to authenticate themselves or log in to an account (e.g., provide identifying information of the unique user profile, such as a username, email address, password, unique user identification number, etc.) to thereby integrate it with the server-based XR system. For example, the external device may provide a view into an artificial reality environment where a user's avatar is positioned, e.g., through its flat panel display. The integrated external device can then capture sensor data and transmit that sensor data and/or commands to an XR system across a network, such as a wireless communication network.

Sensor fusion algorithm(s) 438 can process one or more sources of sensor data to mitigate sensor noise, improve the accuracy of sensor data, infer kinematic states that aren't directly measurable (e.g., derive velocity from acceleration), improve the accuracy or confidence interval of an inferred state, and/or otherwise combine multiple sources of information to pre-process data for downstream analyses. For instance, gesture recognizer 444 may be adapted to receive absolute orientation information, whereas sensor data may include gyroscope data indicating a change in orientation at discrete time intervals. In this example, sensor fusion algorithm(s) 438 can pre-process the data—such as de-noise the gyroscope data against other sensor data, integrate the change in orientation data to estimate the absolute orientation at different points in time, etc. —such that the pre-processed data is compatible with the gesture recognizer 444. As another example, sentiment analyzer 440 might include a neural network that is designed to receive inputs in a particular form, such as a maximum number of audio segments and/or an image in a particular color space and/or resolution. Sensor fusion algorithm(s) 438 can prepare "raw" sensor data (i.e., sensor data as it is provided to the XR system) for processing by various downstream modules. Additional details about sensor fusion are provided below with respect to sensor fusion algorithm(s) 710 of FIG. 7.

Sentiment analyzer 440 can process sensor data to infer an emotional state of a user. For instance, sentiment analyzer 440 can process an audio segment to analyze the tonal qualities of a user's voice to infer their level of excitement and/or mood. Sentiment analyzer 440 can also perform speech-to-text to determine the word(s) spoken by a user and process those word(s) with a natural language processing (NLP) model to perform sentiment analysis. In some cases, sentiment analyzer 440 can process images and/or videos to determine the user's pose, recognize facial expressions, and/or otherwise infer the user's emotional state. Examples of sentiments include "happy," "quiet," "social," "solemn," etc. As an example, the "happy" sentiment can be determined from positive words, a user's hands in the air, a user's smiling expression, and/or other sensor data. A combination of sensor data can be used to improve the accuracy and/or confidence level of analyses performed by sentiment analyzer 440. Additional details about sentiment analyses are provided below with respect to sentiment analyzer 716 of FIG. 7.

Intensity score calculator 442 can process sensor data to determine an intensity level of a user at a given point in time, or over a period of time. For instance, the peak-to-peak amplitude, peak rate of change, dominant frequency, and/or other mathematically-derived value from accelerometer or IMU measurements can be used to estimate how erratic, rapid, or intense the user's movements were over a period of time. In some cases, an intensity level can be inferred from captured audio (e.g., how excited a user's voice is, how quickly the user is breathing, the volume of the user's voice, etc.) and/or from captured images or videos (e.g., the user's facial expressions, how stable or shaky successive camera frames are, etc.). A single intensity level may serve as an intensity score in applications where an "instantaneous" or responsive intensity score is desirable. In other implementations, multiple intensity levels may be averaged, weighted, and/or otherwise mathematically processed to derive an intensity score, which may be used in applications where it is preferable to have a user's intensity score be less responsive and last for a longer period of time (e.g., such that an intensity score does not rapidly move across threshold level(s)).

The intensity score determined by the intensity score calculator 442 can indicate how chaotic or erratic a user's motion and voice is, which in turn defines the level of exaggeration to apply when mapping motion and sound to the user's avatar. For instance, if the user is jumping around and cheering loudly, the intensity score calculator 442 might compute a high intensity score, which generates a motion plan that causes the user's avatar to make movements and/or expressions that are more exaggerated than the user's actual movements and sounds. In some implementations, the intensity score may be normalized to a particular range, such as a scalar value between zero and one. In some embodiments, an intensity threshold may be defined below which anatomical limits of a body model are not exceeded, and above which anatomical limits of a body model can be exceeded (i.e., a "go wild" mode where an avatar's animation is highly exaggerated to a point beyond the constraints of the body model). Additional details about intensity score computations are provided below with respect to intensity score calculator 714 of FIG. 7.

Gesture recognizer 444 can process sensor data to infer which action or gesture a user performed when the sensor data was captured. For instance, IMU data and/or barometric pressure data may be used to infer whether the user is laying, sitting, standing, or in another orientation. As another example, a user's pose can be inferred from image data using a pose recognition model, and a gesture or action can be determined across a sequence of poses. Similarly, a user's facial expression can be determined from image data using a facial keypoint model or the like. For the purposes of the present disclosure, a "gesture" refers to a pose, motion, or sequence of poses or movements performed by a user. The term "gesture" as performed by a user may be described as the real-world analogue of an "animation," which describes a pose, motion, or sequence of poses or movements performed by an avatar.

In some embodiments, gesture recognizer 444 can infer facial expressions based on sensor data and/or sentiments determined by sentiment analyzer 440. For example, gesture analyzer 444 can process audio data to identify phonemes that are mapped to specific facial poses (e.g., pursed lips to form a "p" sound, slightly opened lips to form an "o" sound, etc.). In addition, gesture analyzer 444 can map various sentiments to respective facial expressions (e.g., raising one eyebrow for confused sentiment, raising both eyebrows for a surprised tone, furrowed brow for a worried tone, etc.). As another example, gesture recognizer 444 detect laughing or singing by the user, such that an avatar can be controlled to perform similar facial movements that correspond to the detected audio. Some combination of sensor data, audio data, and image data can be used by gesture recognizer 444 to improve the accuracy or fidelity of an inferred gesture. Additional details about gesture recognition are provided below with respect to gesture recognizer 712 of FIG. 7.

Motion template library 446 can store parameterized animation models that can be applied to a particular avatar and tuned according to kinematic rules, sentiment, intensity scores, and/or other factors. Some example motion templates include waving, bowing, shrugging, cheering, beckoning, jumping, dancing, clapping, saluting, and/or other suitable types of animations. A given motion template may be tuned to understate or exaggerate an animation based on the user's sentiment, intensity score, kinematic rules, and/or user configurations. A motion template can be used by motion planner 448 to generate a motion plan, or a sequence of movements that, when applied to an avatar, causes the avatar to perform an animation. Additional details about motion templates are provided below with respect to motion templates 718 of FIG. 7.

Motion planner 448 can generate a motion plan based some combination of sensor data, fused sensor data, a gesture classified from the sensor data, an intensity score computed based on the sensor data, user sentiment inferred from the sensor data, one or more motion templates, kinematic rules associated with an avatar's body model, and user privacy preferences. For example, a particular motion template from motion template library 446 may be selected based on a user's gesture determined by gesture recognizer 444 (e.g., a motion template that satisfactorily matches the detected user gesture). Motion planner 448 can also obtain kinematic rules about an avatar's body model from kinematic rules engine 434, which define kinematic relationships and constraints of various body parts of the avatar. In addition, motion planner 448 can receive some combination of sensor data and information derived therefrom (e.g., intensity score, sentiment, etc.) to modulate or configure the selected motion template. For example, the expressiveness of a particular facial expression motion template may be understated or exaggerated based on the intensity score, sentiment, sensor data, and/or user preferences. As another example, the speed and apparent enthusiasm of an animation can be configured based on the intensity score, sentiment, sensor data, and/or user preferences.

Using some combination of algorithms, statistical models, machine learning models, and/or other heuristics, motion planner 448 can generate a sequence of frames that each define an incremental change in the position and/or orientation of certain body parts of an avatar which, when applied to the avatar in an XR environment, causes the avatar to perform an animation. The fidelity of the animation with respect to the user's real-world behavior captured by external device sensor data may depend on the accuracy and granularity of each of the specialized components 430. For instance, one XR system may only permit the user to perform a few discrete animations, such that the nuances of a user's real-world gesture may not closely match any of the motion templates 446. However, it may be desirable to limit the available motion templates 446 based on, for example, the context of a particular XR application. For example, an XR application for attending a virtual concert may limit the user's avatar to perform waving, clapping, cheering, and dancing animations, while not providing motion templates for other animations that are less likely to be used within that context. Additional details about motion planning are provided below with respect to motion planner 724 of FIG. 7.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
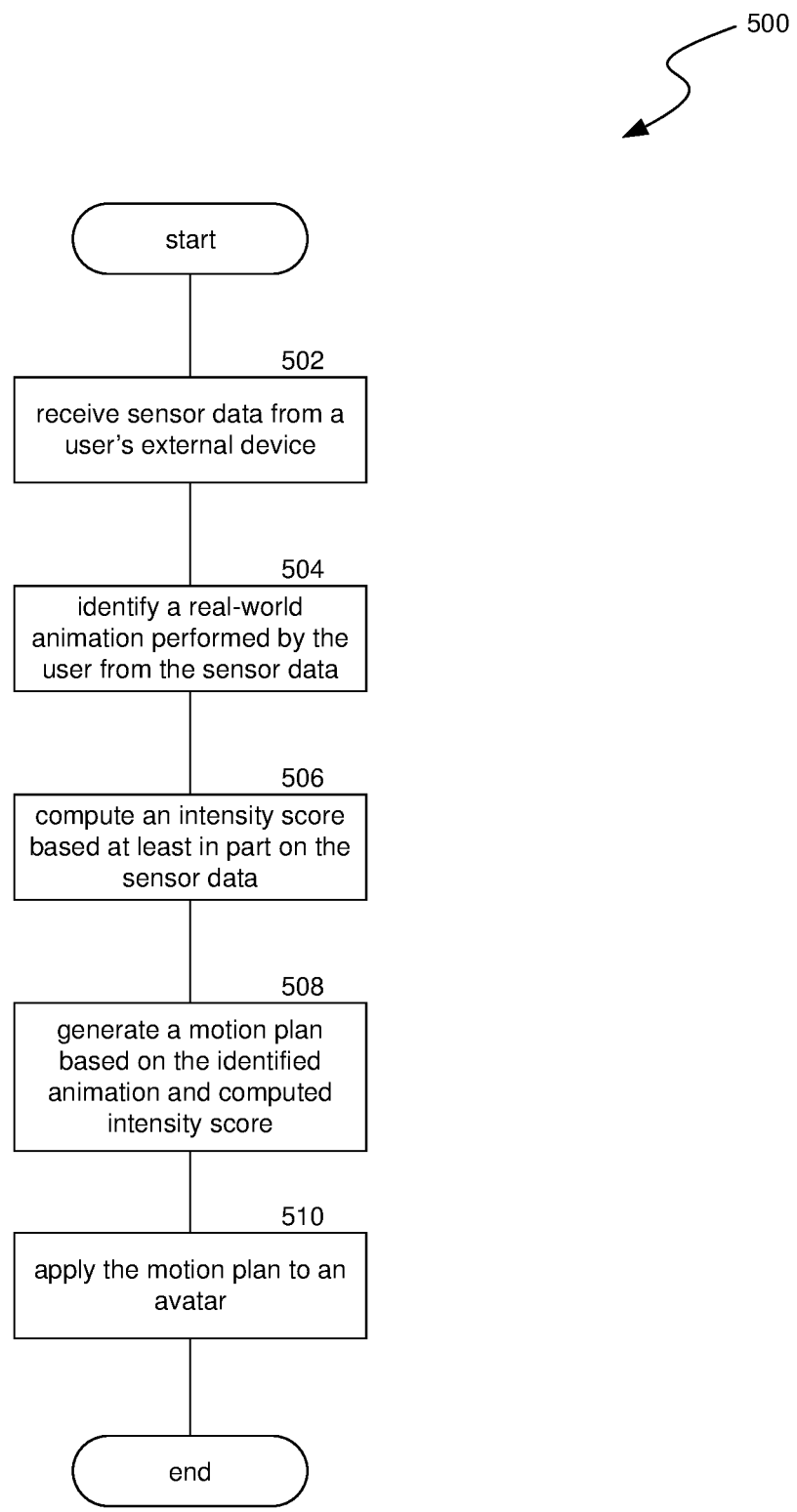
FIG. 5 is a flow diagram illustrating a process used in some implementations of the present technology for generating a motion plan to animate an avatar's body from external device sensor data.

FIG. 5 is a flow diagram 500 illustrating a process used in some implementations of the present technology for generating a motion plan to animate an avatar's body from external device sensor data. In some implementations, process 500 can be performed when an XR device, mobile device, or other system is initialized (e.g., as a user enters an artificial reality environment), when a user first sets up the device, periodically (e.g., daily or weekly), in response to a user launching an application on an XR device, in response to a user launching an application on an external device, etc. In various cases, process 500 can be performed on a device (e.g., artificial reality device, mobile phone, laptop, etc.) that generates motion plans for XR avatars, or on a server system supporting such client devices. Process 500 may begin after a trigger event, such as when an XR application is launched, or may occur on a loop (e.g., repeatedly over time to animate an avatar for the duration of the user's participation in an XR application).

At step 502, process 500 receives sensor data from a user's external device, such as a mobile device. The user's external device may read data from sensor device(s) embedded on the device or from peripherals connected to the device. In some cases, the external device may read analog signals and convert them to digital information. In some embodiments, the user can specify preferences to selectively disable one or more sensor inputs—such as the camera or microphone—to maintain their preferred level of privacy. An application running on the external device can collect sensor data from one or more sources across one or more time steps, package up that data into a payload, and transmit that payload across a network to an XR system for receipt by process 500. In some cases, the format of the data payload may be standardized by the external device application, such that different types of external devices with different sensor hardware can output a stream of data that is compatible with process 500.

At step 504, process 500 identifies a real-world animation or gesture performed by the user based on the sensor data from the user's external device. Sensor data may include IMU data, altimeter data, and/or other kinematic sensors that record user movement over a period of time. Based on this sensor data, process 500 can infer the user's posture and track changes in the user's pose. In some cases, process 500 can recognize certain patterns or events in the sensor data (e.g., using pre-trained neural network(s)) to identify gestures or otherwise infer user activity. In some cases, process 500 can recognize a gesture from image or video data, such as by detecting body keypoints using pose detection and/or activity recognition models.

At step 506, process 500 computes an intensity score based at least in part on the sensor data from the user's external device. The intensity score may be mathematically derived from one or more intensity levels determined for previous time windows (e.g., sum, moving average, weighted average, etc.). In some implementations, process 500 can determine an intensity sub-score for each source of sensor data (e.g., linear acceleration intensity, rotational acceleration intensity, audio loudness, etc.), which may be filtered or combined to determine an intensity level for a window of time defined by the received sensor data. For example, an intensity level may be the highest intensity sub-score, as a user's emotion state may be captured more strongly by one sensor than by others. In some implementations, the computed intensity level may be combined with one or more previously-determined intensity levels to calculate an intensity score.

Computing an intensity sub-score for a particular sensor or type of sensor data may involve normalizing the sensor data against a predetermined range of values for that sensor. For example, an accelerometer may be capable of measuring acceleration between −8 G and +8 G, such that a peak-to-peak acceleration value of 16 G would indicate the largest possible peak-to-peak acceleration value for that sensor. As another example, microphone loudness measured in absolute decibels may have a nominal range of 40 dB to 100 dB, such that audio levels at or above 100 dB are considered the highest level of intensity. Even though the microphone may be capable of recording louder sounds, 100 dB may be considered to be loud enough to be considered a peak intensity with respect to the sounds a user is making (e.g., cheering, singing, shouting, etc.). In this manner, each intensity sub-score can be normalized, such that they can be meaningfully compared and used to compute a multi-modal intensity level and/or intensity score.

At step 508, process 500 generates a motion plan for a user's avatar in an XR environment based on the identified animation and the computed intensity score. Process 500 can generate a motion plan using a motion planner, such as motion planner 448 as described above with respect to FIG. 4 or motion planner 724 as described below with respect to FIG. 7. Step 508 may involve receiving parameters from different pre-processing modules, which serve as inputs to one or more models to generate a motion plan. An example diagram illustrating the various inputs into a motion planner is shown and described with respect to FIG. 7.

At step 510, process 500 applies the motion plan to the user's avatar in the XR environment. More particularly, process 500 can apply a motion plan by actuating one or more joints and/or body parts of an avatar to effect changes in the avatar's pose across a sequence of frames as defined in the motion plan. In some implementations, a motion plan can specify how much to move each joint or movement point on an avatar's body model. In other implementations, a motion plan might specify one or more key frames, which an XR engine can interpolate to determine how to control the avatar to transition its pose between key frames. In yet other implementations, a motion plan can involve specifying a path or end state of a particular body part (e.g., moving the avatar's hand above its head), with the specific joint angles and body poses being determined by an XR engine using inverse kinematics. The specific output of step 510 may depend on how the XR engine and/or XR application implement avatar control. Regardless of the specific format of the output, applying a motion plan can result in the avatar performing an animation that is similar to the inferred user gesture and modulated based on various factors, such as the user's preferences, level of intensity, and sentiment, among other possible factors.

Steps 502-510 can be repeated one or more times to enable a user to control an avatar in an XR environment substantially continuously for a period of time.

Figure 6:
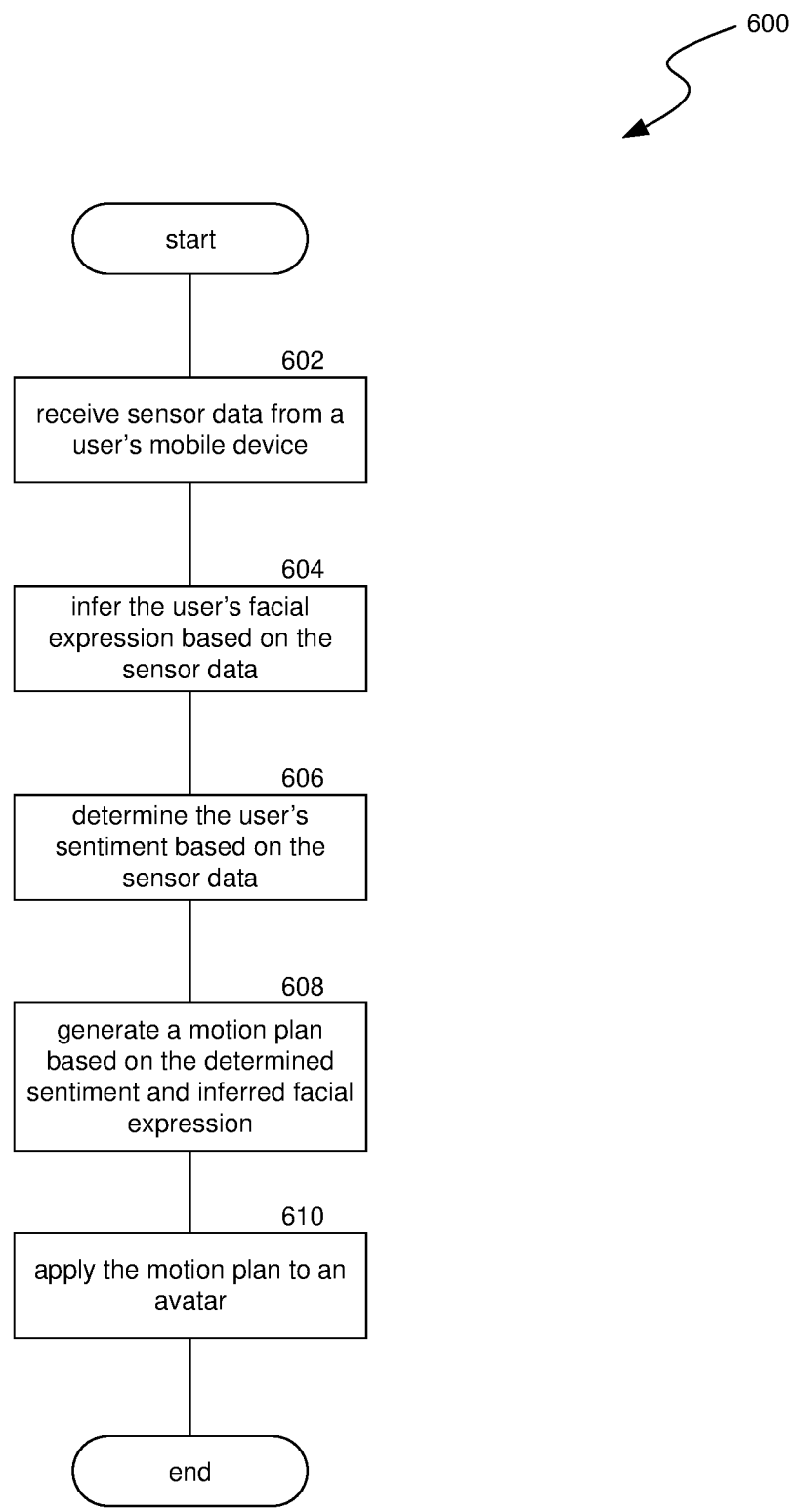
FIG. 6 is a flow diagram illustrating a process used in some implementations of the present technology for generating a motion plan to animate an avatar's face from external device sensor data.

FIG. 6 is a flow diagram 600 illustrating a process used in some implementations of the present technology for generating a motion plan to animate an avatar's face from external device sensor data. In some implementations, process 600 can be performed when an XR device, mobile device, or other system is initialized (e.g., as a user enters an artificial reality environment), when a user first sets up the device, periodically (e.g., daily or weekly), in response to a user launching an application on an XR device, in response to a user launching an application on an external device, etc. In various cases, process 600 can be performed on a device (e.g., artificial reality device, mobile phone, laptop, etc.) that generates motion plans for XR avatars, or on a server system supporting such client devices. Process 600 may begin after a trigger event, such as when an XR application is launched, or may occur on a loop (e.g., repeatedly over time to animate an avatar for the duration of the user's participation in an XR application).

At step 602, process 600 receives sensor data from a user's external device, such as a mobile device. Step 602 may be similar to or the same as step 502 as described above with respect to FIG. 5.

At step 604, process 600 infers the user's facial expression based on the sensor data from the user's external device. For example, process 600 can recognize facial expressions using a facial keypoint detection or the like on image or video data. The arrangement of detected facial keypoints may be classified by a facial expression model to infer which facial expression a user is making. Some example facial expressions include smiling, frowning, winking, and laughing, among other possible facial expressions.

At step 606, process 600 determines the user's sentiment based on the sensor data from the user's external device. Step 606 may be similar to step 504 as described above with respect to FIG. 5. Step 606 may also receive facial keypoints detected at step 604. In some implementations, feature extraction may be performed on semantically distinct regions of the user's face, which can be processed using machine learning to determine whether the user is happy, sad, excited, angry, surprised, or experiencing some other emotion. In other implementations, machine learning model(s) can perform image recognition and/or object detection to classify a user's facial expression without pre-processing steps or keypoint detection.

In some cases, a particular facial expression might be used to represent two or more different sentiments (e.g., raised eyebrows can indicate surprise, curiosity, or shock). Conversely, two or more facial expressions may both indicate the same or similar sentiment (e.g., smiling or grinning with the user's mouth being open or closed may all indicate that the user is happy). Thus, it may be desirable to contextualize a detected facial expression to more accurately discern the user's sentiment using other sensor data, such as audio recordings.

In addition, step 606 can involve performing sentiment analysis on a user's voice and/or words spoken by the user. For example, spoken words can be transcribed using speech-to-text models, which can be subsequently processed using NLP techniques to semantically analyze the user's speech. Known sentiment analysis techniques can be applied to the user's speech in order to classify the overall sentiment of the user.

At step 608, process 600 generates a motion plan for a user's avatar in an XR environment based on the determined sentiment and the inferred facial expression. Similarly to step 508 of process 500, process 600 can generate a sequence of frames or keyframes in which one or more facial movement points are each moved between a starting position and an ending position, which collectively causes the avatar's facial expression to transition from its current facial expression to the detected facial expression of the user. The level of exaggeration of the animation defined by the motion plan may depend on a variety of factors, such as an intensity score, the inferred user sentiment, user preferences, and/or other possible factors.

At step 610, process 600 applies the motion plan to the user's avatar in the XR environment. Step 610 may be similar to or the same as step 510 as described above with respect to FIG. 5. Steps 602-610 can be repeated one or more times to enable a user to control an avatar in an XR environment substantially continuously for a period of time.

Figure 7:
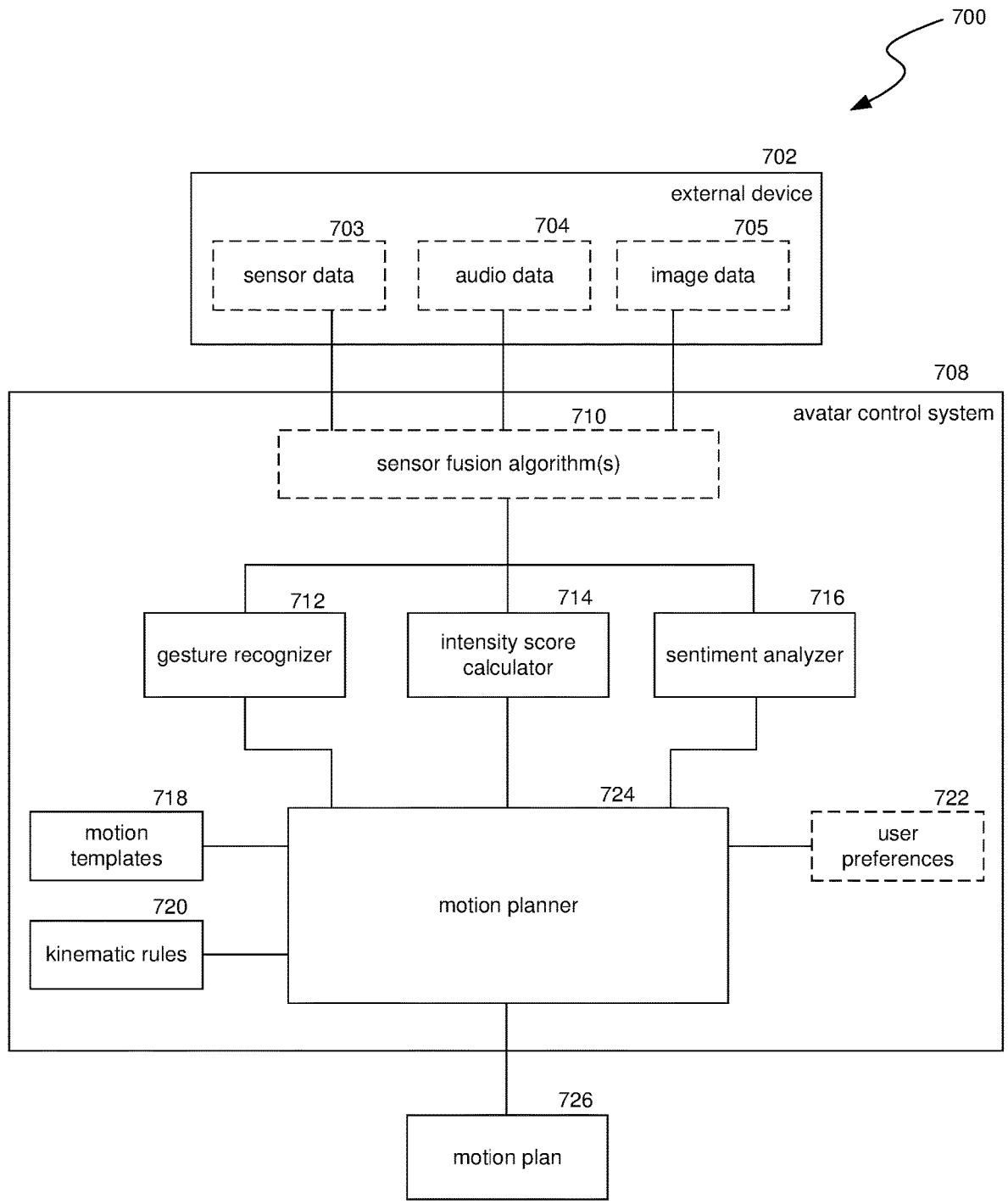
FIG. 7 is a conceptual diagram illustrating a parameterized motion planning process based on external device sensor data.

FIG. 7 is a conceptual diagram 700 illustrating a parameterized motion planning process based on external device sensor data. An external device 702 can capture and transmit sensor data 703, audio data 704, and image data 705 to avatar control system 708 (e.g., over a network such as a local area network (LAN) or the Internet). In some embodiments, avatar control system 708 can process the data using sensor fusion algorithm(s) 710 to infer non-measured states, de-noise sensor data, and/or otherwise pre-process the data 703-705 to prepare it for downstream processing. Data 703-705 and/or the output of sensor fusion algorithm(s) 710 are provided to other modules of the avatar control system 708—including gesture recognizer 712, intensity score calculator 714, and sentiment analyzer 716—which further classifies, contextualizes, and/or calculates statistical information from data 703-705.

Motion planner 724 can receive a combination of data 703-705, fused data from sensor fusion algorithm(s) 710, an inferred gesture from gesture recognizer 712, an intensity score from intensity score calculator 714, and/or user sentiment from sentiment analyzer 716, all of which serve as inputs to a motion planning model. In addition, motion planner 724 may select a motion template from motion templates 718, which serves as the basis or framework for generating a motion plan. Motion planner 724 can also access kinematic rules 720, which may constrain the range of motion of an avatar's body model to within a define set of kinematic relationships between each body part of the avatar.

In some cases, motion planner 724 can receive user preferences, which can configure how motion planner 724 modulates motion templates 718 based on the various parameters. For example, a user may configure an intensity limiter that defines the maximum intensity score to use when generating a motion plan, such that calculated intensity scores above that maximum threshold are clamped or gated to prevent the motion plan from being more exaggerated than the user prefers. As another example, a user may wish to increase the sensitivity of the motion planner 724 to intensity scores, such that a user's sensed gestures are either greatly understated or greatly exaggerated relative to their real-world level of intensity. Other user preferences are also possible, which enable users to manually configure or modulate the ways in which various parameters affect avatar animations.

Figure 8:
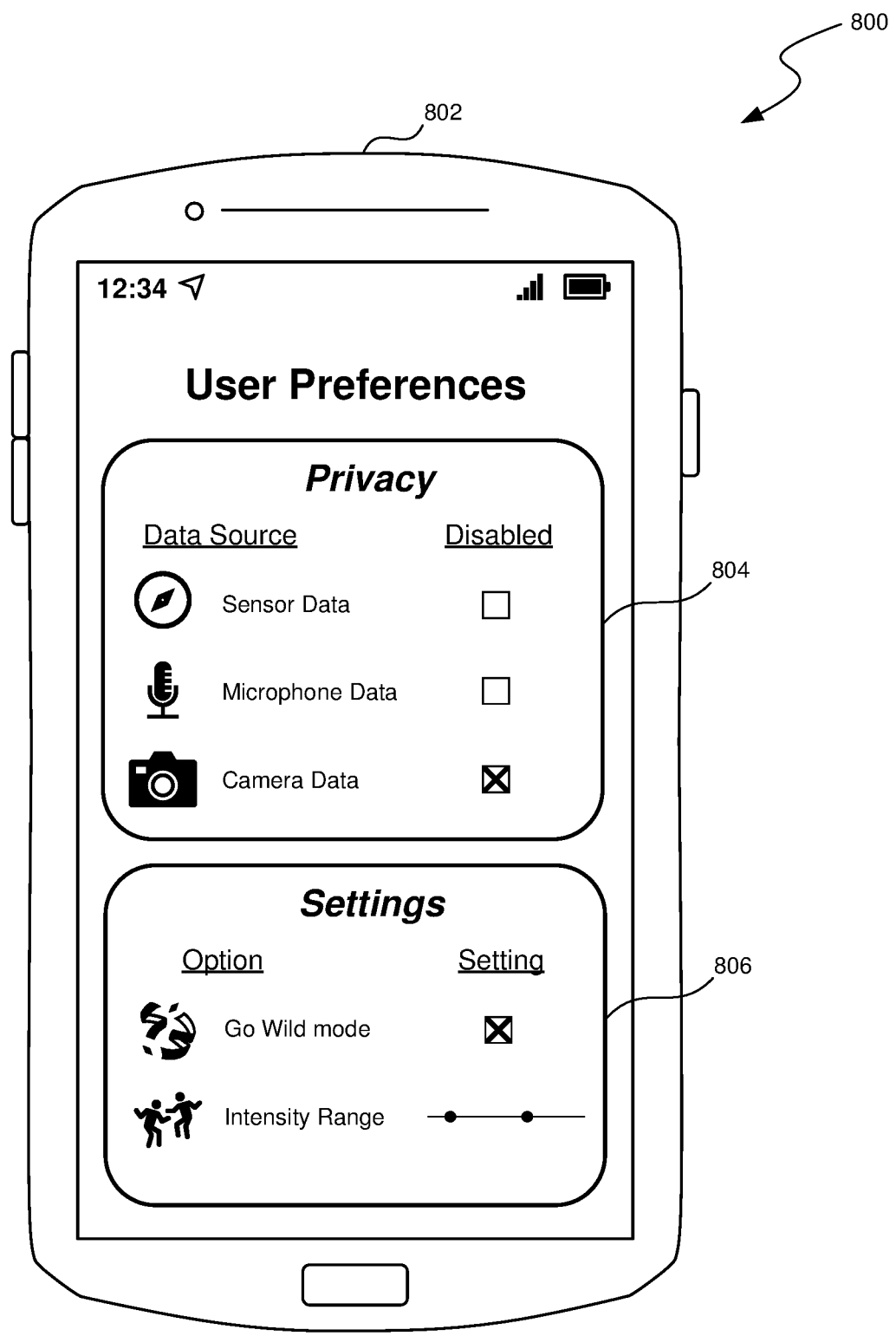
FIG. 8 is a conceptual diagram illustrating an example user interface for managing a user's privacy preferences with respect to capturing sensor data on an external device.

FIG. 8 is a conceptual diagram 800 illustrating an example user interface (UI) on an external device 802 for managing a user's privacy preferences with respect to capturing sensor data on an external device. More particularly, diagram 800 shows an example UI for a user application that interfaces with an avatar control system to configure the user's preferences with respect to privacy and avatar animations. The UI includes a privacy preferences section 804, which allows the user to selectively disable available data sources (e.g., to preserve the user's privacy). In this example, the user can selectively disable the reading and transmission of sensor data, microphone data, and camera data, such that the mobile application interfacing with the avatar control system does not attempt to access blocked sensors, microphones, or transducers in violation of the user's privacy preferences.

The UI also includes an animation settings section 806, which allows the user to configure aspects of the avatar control system and the manner in which it generates motion plans for the user's avatar. For example, a user may wish to selectively enable a "Go Wild" mode which, when enabled, allows the avatar control system to animate the user's avatar in a way that exceeds the biological, anatomical, and/or anthropomorphic limitations of the user's avatar's body model. In some implementations, the threshold intensity score may be manually configured by the user, such that the Go Wild mode is triggered at a user-specified intensity threshold. Alternatively and/or additionally, the user can configure a range of intensity scores that can be used to generate avatar motion plans, including a minimum intensity and a maximum intensity. In this example, the minimum intensity is set above the lowest possible value (i.e., zero intensity, or no animation) and below the maximum intensity, such that user's avatar may perform animations that are lively, but not overly exaggerated (which certain users may not prefer). Other user preferences are also possible.

It will be appreciated that the contents, layout, and styling of a user application's UI may vary among different implementations, and that the example shown in FIG. 8 is provided for explanatory purposes only.

Figure 9:
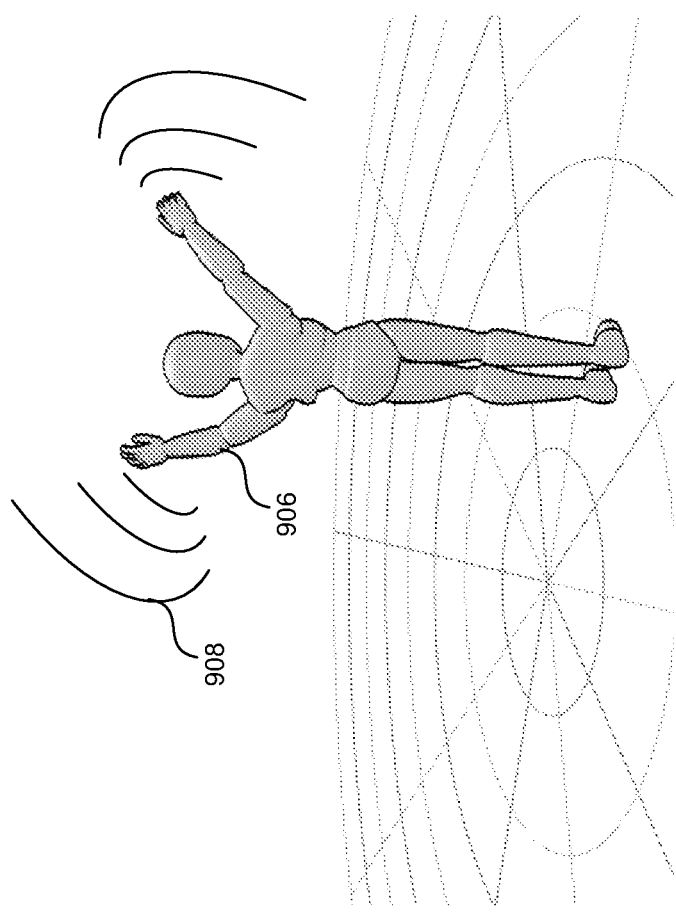
FIG. 9 is a conceptual diagram illustrating an example of an avatar in an artificial reality environment moving according to user movement of a mobile device.
Figure 9:
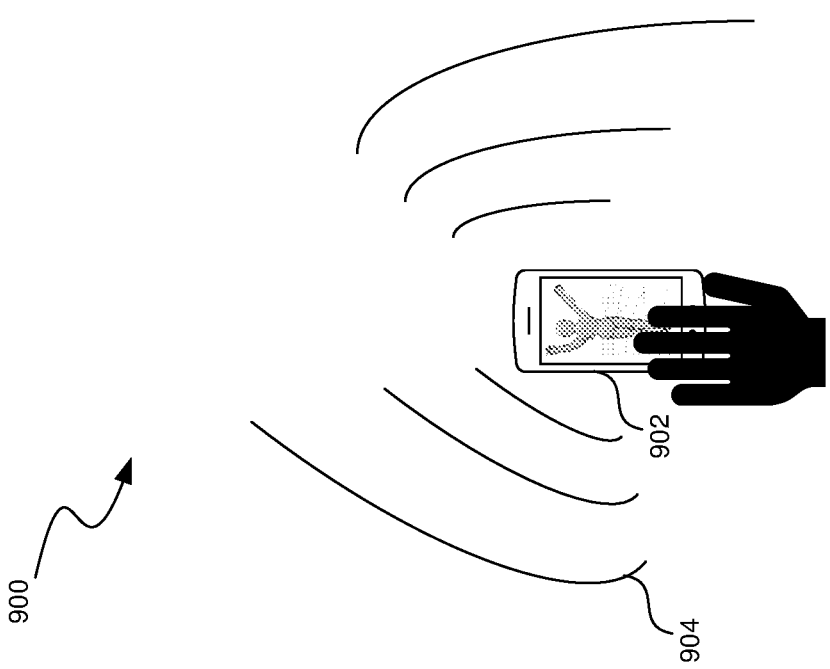

FIG. 9 is a conceptual diagram 900 illustrating an example of an avatar 906 in an artificial reality environment moving according to user movement of a mobile device 902. The left side of diagram 900 illustrates a user moving her real-world mobile device 902 back and forth, as indicated by movement lines 904. The mobile device 902 captures sensor data for this motion and transmits it to an XR application on a remote server. The remote server is in control of an artificial reality environment shown to the user on the mobile device 902. The remote server determines a movement pattern for avatar 906 based on the sensor data and causes the avatar 906 to move according to the movement pattern, as indicated by movement lines 908.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for controlling an avatar in a virtual environment, the method comprising:
    receiving, from a mobile device associated with a user, sensor data captured by one or more sensors of the mobile device, wherein the sensor data is based on movement of the mobile device and wherein the mobile device provides a view into the virtual environment, and wherein the one or more sensors includes a microphone;
    selecting a motion template from a plurality of motion templates based on the sensor data, wherein the motion template defines a baseline animation, wherein the motion template is configurable using one or more parameters to modify the baseline animation, and wherein selecting the motion template comprises classifying audio data, from the microphone, according to a model;
    computing an intensity score based at least in part on the received sensor data, wherein the intensity score is indicative of a level of excitement of the user;
    generating a motion plan based at least in part on the selected motion template and the computed intensity score, wherein the motion plan defines an animation for an avatar; and
    causing the avatar to perform the animation according to the generated motion plan.

2. The method of claim 1, wherein the one or more sensors includes an accelerometer, wherein the sensor data includes acceleration data, and wherein selecting the motion template comprises classifying the acceleration data using a model to determine a gesture.

3. The method of claim 1, wherein the one or more sensors includes an accelerometer, wherein the sensor data includes acceleration data and wherein computing the intensity score comprises:
    determining one or more peak-to-peak amplitude values from the acceleration data in at least one dimension;
    normalizing the determined one or more peak-to-peak amplitude values; and
    determining the intensity score based at least in part on the normalized one or more peak-to-peak amplitude values.

4. The method of claim 1, wherein the one or more sensors includes a microphone, wherein the sensor data includes audio data and wherein computing the intensity score comprises:
    calculating an average loudness across at least a portion of the audio data;
    normalizing the calculated average loudness based on a predetermined mapping; and
    determining the intensity score based at least in part on the normalized average loudness.

5. The method of claim 1, wherein the one or more sensors includes a camera, wherein the sensor data includes image data, and wherein selecting the motion template comprises detecting a user pose based on the image data.

6. The method of claim 1, wherein the one or more sensors includes a camera, wherein the sensor data includes image data, and wherein computing the intensity score comprises:
    calculating a cumulative movement metric across at least a portion of the image data;
    normalizing the cumulative movement metric based on a predetermined mapping; and
    determining the intensity score based at least in part on the normalized cumulative movement metric.

7. The method of claim 1, further comprising:
generating, based on the received sensor data and a sensor fusion algorithm, inferred kinematic data,
wherein selecting the motion template is further based on the inferred kinematic data.

8. The method of claim 1, further comprising:
obtaining user preferences that at least define an intensity score threshold;
determining that the computed intensity score exceeds the intensity score threshold; and
modifying the computed intensity score to be at or below the intensity score threshold defined by the user preferences.

9. The method of claim 1, further comprising:
determining that the intensity score exceeds a threshold intensity score,
wherein generating the motion plan is further based on the determination that the intensity score exceeds the threshold intensity score, and
wherein the motion plan defines the animation for the avatar to exceed a set of kinematic rules associated with a body model of the avatar, wherein the set of kinematic rules define a range of movement for each body part of a body model of the avatar.

10. A non-transitory computer-readable storage medium storing instructions that, when executed by a computing system, cause the computing system to perform a process for controlling an avatar in a virtual environment, the process comprising:
receiving, from a mobile device associated with a user, sensor data captured by one or more sensors of the mobile device, wherein the one or more sensors includes a microphone;
recognizing a facial expression based at least in part on the received sensor data;
selecting a motion template from a plurality of motion templates based on the recognized facial expression, wherein the motion template defines a baseline animation, and wherein the motion template is configurable using one or more parameters to modify the baseline animation, and wherein selecting the motion template comprises classifying audio data, from the microphone, according to a model;
determining a user sentiment based at least in part on the received sensor data;
generating a motion plan based at least in part on the selected motion template and the determined user sentiment, wherein the motion plan defines an animation for an avatar; and
causing the avatar to perform the animation according to the generated motion plan.

11. The non-transitory computer-readable storage medium of claim 10, wherein recognizing the facial expression comprises:
detecting at least one phoneme from the audio data; and
determining, based on a phoneme to facial expression mapping, a facial expression based on the at least one detected phoneme.

12. The non-transitory computer-readable storage medium of claim 10, wherein determining the user sentiment comprises:
generating, using a speech-to-text model, text data based on the audio data; and
determining, using a natural language processing model, the user sentiment based on the text data.

13. The non-transitory computer-readable storage medium of claim 10, wherein the one or more sensors includes a camera, wherein the sensor data includes image data, and wherein recognizing the facial expression comprises:
detecting a plurality of facial keypoints from the image data; and
classifying the plurality of facial keypoints using a model to determine the facial expression.

14. The non-transitory computer-readable storage medium of claim 10, wherein the one or more sensors includes a camera, wherein the sensor data includes image data, and wherein recognizing the facial expression comprises classifying the image data using an image classification model to determine the facial expression.

15. A computing system for controlling an avatar in a virtual environment, the computing system comprising:
one or more processors; and
one or more memories storing instructions that, when executed by the one or more processors, cause the computing system to perform operations comprising:
receiving sensor data captured by one or more sensors of a user's mobile device, wherein the sensor data is based on movement of the mobile device and wherein the mobile device provides a view into the virtual environment, and wherein the one or more sensors includes a microphone;
selecting a motion template from a plurality of motion templates based on the sensor data, wherein the motion template defines a baseline animation, and wherein the motion template is configurable using one or more parameters to modify the baseline animation, and wherein selecting the motion template comprises classifying audio data, from the microphone, according to a model;
computing an intensity score based at least in part on the received sensor data, wherein the intensity score is indicative of a level of excitement of the user;
generating a motion plan based at least in part on the selected motion template and the computed intensity score, wherein the motion plan defines an animation for an avatar; and
causing the avatar to perform the animation according to the generated motion plan.

16. The computing system of claim 15, wherein the operations further comprise:
generating, based on the received sensor data and a sensor fusion algorithm, inferred kinematic data,
wherein selecting the motion template is further based on the inferred kinematic data.

17. The computing system of claim 15, wherein the operations further comprise:
obtaining user preferences that at least define an intensity score threshold;
determining that the computed intensity score exceeds the intensity score threshold; and
modifying the computed intensity score to be at or below the intensity score threshold defined by the user preferences.

18. The computing system of claim 15, wherein the operations further comprise:
determining that the intensity score exceeds a threshold intensity score,
wherein generating the motion plan is further based on the determination that the intensity score exceeds the threshold intensity score, and
wherein the motion plan defines the animation for the avatar to exceed a set of kinematic rules associated with a body model of the avatar, wherein the set of kinematic rules define a range of movement for each body part of a body model of the avatar.

* * * * *